United States Patent
Suzuki et al.

(10) Patent No.: US 10,558,410 B2
(45) Date of Patent: Feb. 11, 2020

(54) IMAGE FORMING APPARATUS

(71) Applicant: CANON KABUSHIKI KAISHA, Tokyo (JP)

(72) Inventors: Ryo Suzuki, Kashiwa (JP); Munehito Kurata, Suntou-gun (JP); Teruhiko Namiki, Mishima (JP); Yasuhisa Matsumoto, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/135,807

(22) Filed: Sep. 19, 2018

(65) Prior Publication Data

US 2019/0087138 A1 Mar. 21, 2019

(30) Foreign Application Priority Data

Sep. 21, 2017 (JP) .................. 2017-181189
Jul. 6, 2018 (JP) .................. 2018-128920

(51) Int. Cl.
*G06F 3/12* (2006.01)
*G03G 15/00* (2006.01)
(Continued)

(52) U.S. Cl.
CPC ............. *G06F 3/1255* (2013.01); *B65H 7/14* (2013.01); *G03G 15/2028* (2013.01);
(Continued)

(58) Field of Classification Search
CPC ............. G03G 15/2028; G03G 15/607; G03G 15/5045; G03G 15/2046; G03G 15/5004;
(Continued)

(56) References Cited

U.S. PATENT DOCUMENTS 5,129,639 A * 7/1992 DeHority ............... G03G 15/50 270/1.01
5,267,727 A * 12/1993 DeHority ............... G03G 15/50 209/556

(Continued)

FOREIGN PATENT DOCUMENTS

JP 2003-84507 A 3/2003
JP 2009-251597 A 10/2009
(Continued)

*Primary Examiner* — David J Bolduc
(74) *Attorney, Agent, or Firm* — Canon U.S.A., Inc., IP Division

(57) ABSTRACT

A control unit of the invention compares printing setting suitable for a determined type of a recording material and printing setting of the recording material input by a user, and in a case where a difference between the printing setting suitable for the determined type of the recording material and the printing setting of the recording material input by the user falls in a predetermined range, the control unit performs a printing operation in accordance with the printing setting of the recording material input by the user, and in a case where the difference is greater than the predetermined range, the control unit performs the printing operation by changing the printing setting of the recording material input by the user, which is used when the difference is smaller than the predetermined range.

12 Claims, 26 Drawing Sheets

(51) Int. Cl.
  *G03G 15/20* (2006.01)
  *B65H 7/14* (2006.01)
  *G03G 21/14* (2006.01)

(52) U.S. Cl.
  CPC ..... *G03G 15/5004* (2013.01); *G03G 15/5045* (2013.01); *G03G 15/607* (2013.01); *G03G 21/14* (2013.01); *G06F 3/1208* (2013.01); *G06F 3/1254* (2013.01); *G03G 2215/00333* (2013.01); *G03G 2215/2045* (2013.01)

(58) Field of Classification Search
  CPC ....... G03G 15/6591; G03G 2215/2035; G03G 2215/2045; G03G 2215/00333; G06F 3/1208; G06F 3/1255; G06F 3/1254; B65H 7/14
  See application file for complete search history.

(56) References Cited

U.S. PATENT DOCUMENTS

| | | | | |
|---|---|---|---|---|
| 5,459,580 A * | 10/1995 | Suzuki | ............ | B41J 11/003 347/139 |
| 5,852,462 A * | 12/1998 | Lloyd | ............ | G03G 15/2003 347/156 |
| 6,594,028 B1 * | 7/2003 | Hamamoto | ............ | G06F 3/1204 347/14 |
| 7,054,016 B2 * | 5/2006 | Nagata | ............ | G06F 3/1204 358/1.13 |
| 8,699,082 B2 * | 4/2014 | Kim | ............ | G03G 15/553 347/112 |
| 9,316,954 B2 * | 4/2016 | Yoshida | ............ | G03G 15/234 |
| 2003/0053810 A1 * | 3/2003 | Jackelen | ............ | G06K 15/005 399/16 |
| 2004/0022553 A1 * | 2/2004 | Johnson | ............ | G03G 15/5004 399/75 |
| 2005/0111015 A1 * | 5/2005 | Tsujimoto | ............ | G06K 15/005 358/1.9 |
| 2005/0286100 A1 * | 12/2005 | Uotani | ............ | G06F 3/1205 358/527 |
| 2006/0109491 A1 * | 5/2006 | Naito | ............ | G03G 15/043 358/1.13 |
| 2006/0126119 A1 * | 6/2006 | Morales | ............ | G06F 3/1208 358/1.18 |
| 2006/0181726 A1 * | 8/2006 | Naito | ............ | G03G 15/043 358/1.14 |
| 2007/0229895 A1 * | 10/2007 | Fujimori | ............ | G06F 3/1208 358/1.16 |
| 2008/0180715 A1 * | 7/2008 | Kawaura | ............ | B41J 11/009 358/1.13 |
| 2008/0205909 A1 * | 8/2008 | Koakutsu | ............ | G03G 15/556 399/9 |
| 2008/0205912 A1 * | 8/2008 | Arakawa | ............ | G03G 15/5025 399/16 |
| 2010/0188680 A1 * | 7/2010 | Xiao | ............ | G06F 3/1205 358/1.13 |
| 2012/0195653 A1 * | 8/2012 | Sasaki | ............ | G03G 15/20 399/327 |
| 2015/0077769 A1 * | 3/2015 | Chigusa | ............ | H04L 67/10 358/1.5 |
| 2016/0039234 A1 * | 2/2016 | Hirai | ............ | G06F 3/1206 347/5 |
| 2016/0205281 A1 * | 7/2016 | Narita | ............ | G06F 3/1204 399/82 |
| 2017/0123353 A1 * | 5/2017 | Sako | ............ | G03G 15/55 |
| 2017/0208193 A1 * | 7/2017 | Shinohara | ............ | H04N 1/00458 |
| 2017/0269877 A1 * | 9/2017 | Shimanuki | ............ | G06F 3/1204 |

FOREIGN PATENT DOCUMENTS

| | | |
|---|---|---|
| JP | 2012-181223 A | 9/2012 |
| JP | 2016-90654 A | 5/2016 |

* cited by examiner

FIG. 5

|   | PAPER TYPE | BASIS WEIGHT (g/m²) | CONVEYING SPEED (mm/s) | FIXING TEMPERATURE (°C) |
|---|---|---|---|---|
| A | THIN PAPER | 60 TO 74 | 200 | 170 |
| B | PLAIN PAPER | 75 TO 90 | 200 | 180 |
| C | THICK PAPER 1 | 91 TO 120 | 150 | 170 |
| D | THICK PAPER 2 | 121 TO 160 | 100 | 160 |
| E | THICK PAPER 3 | 161 TO 300 | 65 | 150 |

MORE HEAT QUANTITY PER UNIT AREA OF RECORDING MATERIAL ↓

FIG. 10

| | | PRINTING SETTING RECOMMENDED BY MANUFACTURER | | | | |
|---|---|---|---|---|---|---|
| | | A | B | C | D | E |
| PRINTING SETTING INPUT BY USER | A | ○ | △ | × | × | ×× |
| | B | △ | ○ | △ | × | × |
| | C | × | △ | ○ | △ | × |
| | D | × | × | △ | ○ | △ |
| | E | ×× | × | × | △ | ○ |

→ MORE HEAT QUANTITY PER UNIT AREA OF RECORDING MATERIAL

FIG. 11

| | | \multicolumn{5}{c}{PRINTING SETTING RECOMMENDED BY MANUFACTURER} | |
|---|---|---|---|---|---|---|
| | | A | B | C | D | E |
| PRINTING SETTING INPUT BY USER | A | ○ | ○ | ×<br>case2 | ×<br>case2 | ××<br>case2 |
| | B | ○ | ○ | ○ | ×<br>case2 | ×<br>case2 |
| | C | ×<br>case1 | ○ | ○ | ○ | ×<br>case2 |
| | D | ×<br>case1 | ×<br>case1 | ○ | ○ | ○ |
| | E | ××<br>case1 | ×<br>case1 | ×<br>case1 | ○ | ○ |

→ MORE HEAT QUANTITY PER UNIT AREA OF RECORDING MATERIAL

| ○ | WINDING OF RECORDING MATERIAL AROUND SLEEVE OR FIXING FAILURE IS NOT GENERATED |
|---|---|
| case1 | WINDING OF RECORDING MATERIAL AROUND SLEEVE IS GENERATED |
| case2 | CONTAMINATION IS GENERATED IN RECORDING MATERIAL CONVEYING PATH ON AND AFTER FIXING DEVICE DUE TO FIXING FAILURE |

FIG. 12

| | | PRINTING SETTING RECOMMENDED BY MANUFACTURER | | | | |
|---|---|---|---|---|---|---|
| | | A | B | C | D | E |
| PRINTING SETTING INPUT BY USER | A | ○ | ○ | ○ mode3 | ○ mode3 | ○ mode4 |
| | B | ○ | ○ | ○ | ○ mode3 | ○ mode3 |
| | C | ○ mode1 | ○ | ○ | ○ | ○ mode3 |
| | D | ○ mode1 | ○ mode1 | ○ | ○ | ○ |
| | E | ○ mode2 | ○ mode1 | ○ mode1 | ○ | ○ |

→ MORE HEAT QUANTITY PER UNIT AREA OF RECORDING MATERIAL

| | |
|---|---|
| ○ | FIXING PROCESSING OPERATION BY "PRINTING SETTING INPUT BY USER" |
| mode1 | PRE-ROTATION OPERATION IS EXTENDED COMPARED TO "PRINTING SETTING INPUT BY USER" |
| mode2 | PRE-ROTATION OPERATION IS EXTENDED AND TARGET TEMPERATURE IS REDUCED COMPARED TO "PRINTING SETTING INPUT BY USER" |
| mode3 | OUTPUT INTERVAL IS MADE WIDER COMPARED TO "PRINTING SETTING INPUT BY USER" |
| mode4 | OUTPUT INTERVAL IS MADE WIDER AND TARGET TEMPERATURE IS INCREASED COMPARED TO "PRINTING SETTING INPUT BY USER" |

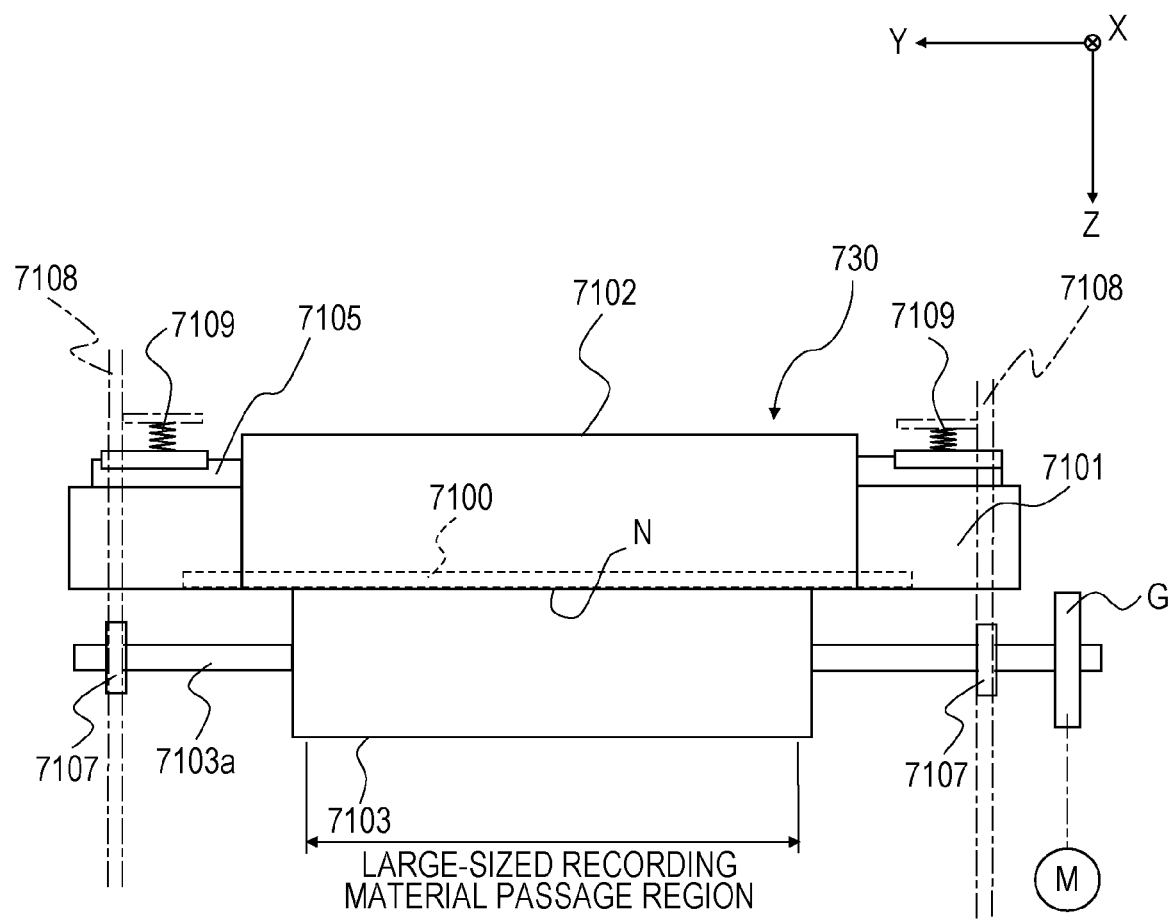

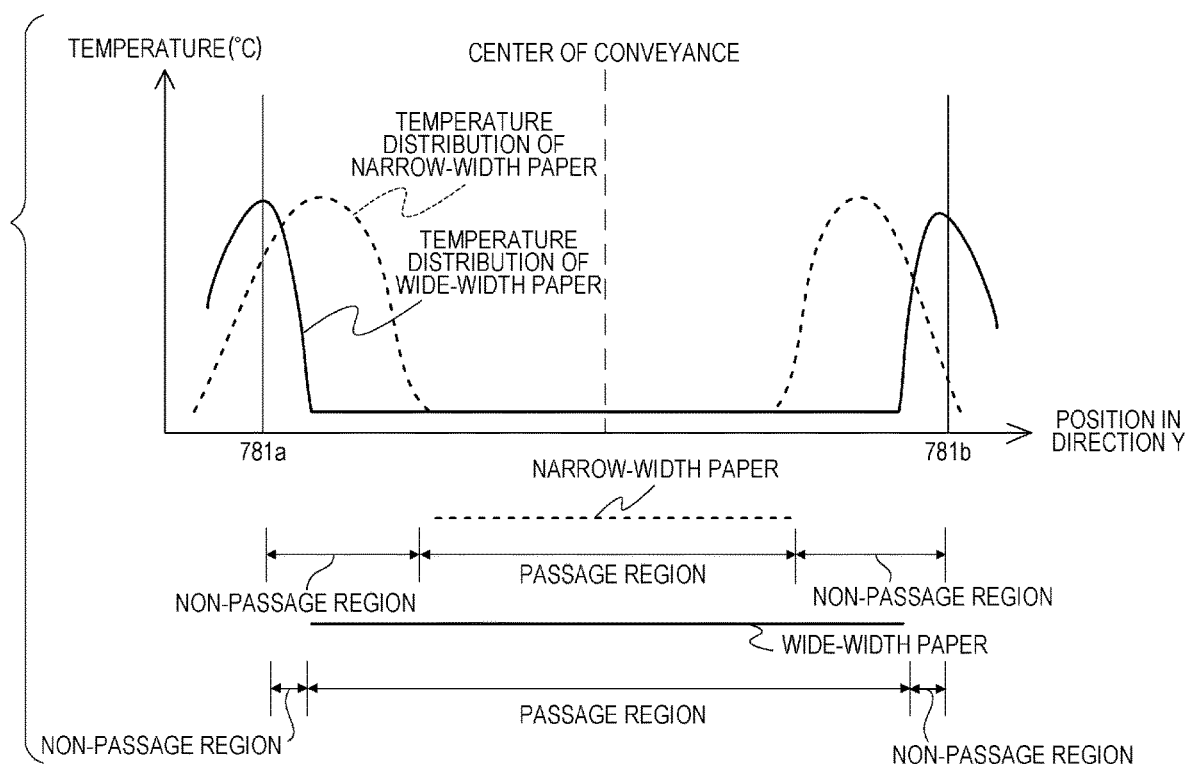

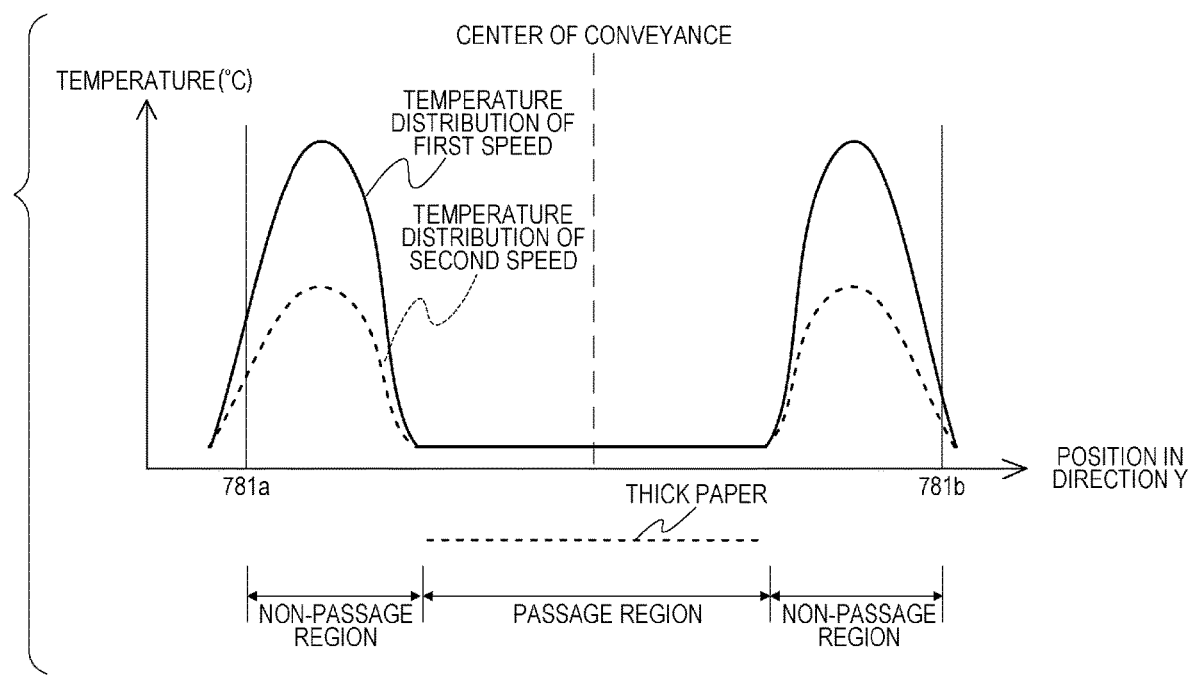

IMAGE FORMING APPARATUS

BACKGROUND OF THE INVENTION

Field of the Invention

The present invention relates to an image forming apparatus such as an electrophotographic copying machine or an electrophotographic printer.

Description of the Related Art

An image forming apparatus, such as an electrophotographic copying machine or an electrophotographic printer, has a plurality of cassettes in which recording materials are stored in accordance with types, a recording material conveyance portion that conveys recording materials from the plurality of cassettes for feeding, and an image forming portion that forms a toner image on each of the recording materials conveyed from the recording material conveyance portion. The image forming apparatus further has a fixing portion that includes a fixing member such as a cylindrical film or a roller, a heating member that generates heat when power is supplied and heats the fixing member, and a nip portion forming member that forms a nip portion with the fixing member. While conveying and heating the recording material, on which the image is formed, by the nip portion, the fixing portion fixes the image on the recording material.

The image forming apparatus described above sets a type of a recording material used by a user for each of the cassettes. When the user selects a type of a recording material, a printing operation is performed in accordance with printing setting which is recommended by a manufacturer and related to fixing processing of the fixing portion. Thereby, optimum image quality according to the type of the recording material is realized.

For realizing optimum image quality according to the type of the recording material, the printing setting recommended by the manufacturer needs to be selected in the image forming apparatus described above. The printing setting recommended by the manufacturer is provided to realize image quality that is satisfactory to a majority of users and such image quality is different from image quality required by an individual user. Thus, in order to realize image quality required by a user, printing setting (hereinafter, referred to as "printing setting set by the user") is input by the user himself or herself in accordance with a type of a recording material from a printing setting input unit provided in a main body of the apparatus.

Japanese Patent Laid-Open No. 2012-181223 discloses an invention that, in a case where "printing setting set by a user" and "printing setting recommended by a manufacture" are different in a type of a recording material that is determined by a sensor, a printing operation is performed in accordance with the "printing setting recommended by the manufacturer". According to the invention of Japanese Patent Laid-Open No. 2012-181223, even in a case where the user performs erroneous printing setting when inputting printing setting, image quality recommended by the manufacture is able to be obtained.

Japanese Patent Laid-Open No. 2009-251597 discloses an invention that, in a case where a type of a recording material is specified by a user, "printing setting set by the user" has priority over "printing setting recommended by a manufacturer". According to the invention of Japanese Patent Laid-Open No. 2009-251597, even when image quality required by the user is different from image quality recommended by the manufacturer, the user is able to obtain image quality required by the user.

In a case where the image quality that is recommended by the manufacturer and satisfactory to a majority of users is different from image quality required by an individual user, when the "printing setting recommended by the manufacturer" is performed on the basis of the type of the recording material as in Japanese Patent Laid-Open No. 2012-181223, the image quality required by the user is difficult to be sufficiently realized in some cases.

On the other hand, in a case where priority is given to the "printing setting set by the user" as in Japanese Patent Laid-Open No. 2009-251597, when the user erroneously selects and specifies the type of the recording material, the "printing setting set by the user" may significantly fall outside a range of the "printing setting recommended by the manufacturer". Also in this case, the image quality required by the user is difficult to be sufficiently realized.

The invention provides an image forming apparatus capable of performing a printing operation in which image quality required by a user is able to be sufficiently realized even in a case where "printing setting suitable for a type of a recording material" and "printing setting set by the user" are different.

SUMMARY OF THE INVENTION

An image forming apparatus includes: a plurality of storage portions in which recording materials are stored; a feeding portion that feeds each of the recording materials from the plurality of storage portions; an image forming portion that forms an image on the recording material fed from the feeding portion; a fixing portion that fixes the image, which is formed on the recording material, to the recording material; a recording material detection unit that outputs information for determining a type of the recording material; a determination processing unit that performs processing for determining the type of the recording material on a basis of the information and outputs a result of the processing; a printing setting input unit that is used for a user to input printing setting of the recording material; and a control unit; in which the control unit determines the type of the recording material on a basis of the result of the processing, compares printing setting suitable of for the determined type of the recording material and printing setting of the recording material input by the user, and in a case where a difference between the printing setting suitable for the determined type of the recording material and the printing setting of the recording material input by the user falls in a predetermined range, the control unit performs a printing operation in accordance with the printing setting of the recording material input by the user, and in a case where the difference falls outside the predetermined range, the control unit performs the printing operation by changing the printing setting of the recording material input by the user.

Further features of the present invention will become apparent from the following description of exemplary embodiments with reference to the attached drawings.

BRIEF DESCRIPTION OF THE DRAWINGS

FIG. 5 illustrates printing setting of a printing setting input unit, which is able to be selected by a user.

FIG. 10 illustrates a gap between "printing setting recommended by a manufacturer" and "printing setting input by a user".

FIG. 11 illustrates generating phenomena of fixing failure of a toner image or recording material winding around a sleeve in a case where a printing operation is performed with the present "printing setting input by the user" in each of states of ○, Δ, x, and xx illustrated in FIG. 10.

FIG. 12 illustrates an effect in a case where the printing operation is changed in accordance with a difference between the "printing setting recommended by the manufacturer" and the "printing setting input by the user".

FIG. 15 illustrates the fixing device as viewed from an upstream side in the recording material conveying direction.

FIG. 19A illustrates imaginary temperature distribution at a time of excessive temperature rising in a non-passage region that is caused when wide-width paper and narrow-width paper are subjected to heat fixing processing.

FIG. 19C illustrates imaginary temperature distribution at a time of excessive temperature rising in a non-passage region that is caused when narrow-width thick paper is subjected to the heat fixing processing at a first speed or a second speed.

DESCRIPTION OF THE EMBODIMENTS

Embodiments of the invention will be described below with reference to the drawings. The embodiments of the invention are merely examples of suitable embodiments of the invention, and the invention is not limited to the following embodiments, and the embodiments can be replaced with other various configurations within a scope of the concept of the invention.

Embodiment 1

(1) Image Forming Apparatus 1

Figure 1:
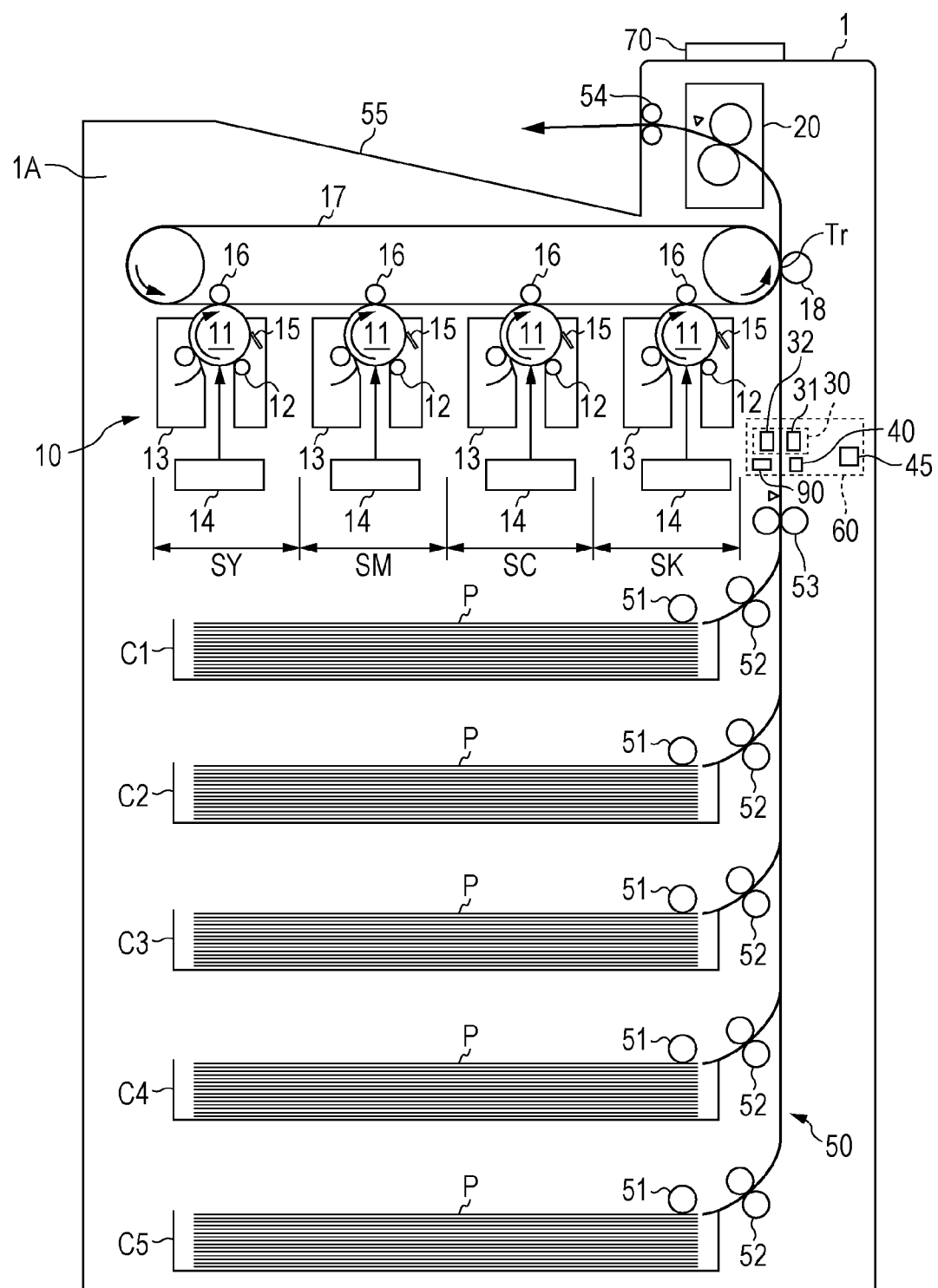
FIG. 1 is a sectional view illustrating a schematic configuration of an image forming apparatus according to the invention.

An image forming apparatus 1 according to the invention will be described with reference to FIG. 1. FIG. 1 is a sectional view illustrating an example of a schematic configuration of the image forming apparatus (a full color printer in the present embodiment) 1 using an electrophotographic recording technique.

The image forming apparatus 1 includes an image forming portion 10 and a fixing device 20 as a fixing portion. The image forming apparatus 1 further includes five cassettes C1, C2, C3, C4, and C5 as a plurality of storage portions in which recording materials P are stored in accordance with types of the recording materials P, and a recording material conveyance portion 50 as a feeding portion that conveys a recording material P from each of the cassettes for feeding.

The image forming portion 10 that forms an image on the recording material P by using toner includes four image forming stations SY, SM, SC, and SK for yellow, magenta, cyan, and black. The image forming stations have photosensitive drums 11 as image carrying members, charging members 12, development units 13, laser scanners 14, cleaners 15 that clean outer peripheral surfaces (surfaces) of the photosensitive drums 11, and transfer members 16. The image forming portion 10 further includes a belt 17 that conveys toner images which are transferred from the respective photosensitive drums 11 by the transfer members 16 while carrying the toner images, and a secondary transfer member 18 that transfers the toner images from the belt 17 to the recording material P.

The operation of the image forming portion 10 described above is widely known, so that detailed description thereof will be omitted.

In the first cassette C1 provided in an apparatus main body 1A, thin paper (basis weight of 60 to 74 $g/m^2$) as the recording material P is stored. In the second cassette C2, plain paper (basis weight of 75 to 90 $g/m^2$) as the recording material P is stored. In the third cassette C3, thick paper 1 (basis weight of 91 to 120 $g/m^2$) as the recording material P is stored. In the fourth cassette C4, thick paper 2 (basis weight of 121 to 160 $g/m^2$) as the recording material P is stored. In the fifth cassette C5, thick paper 3 (basis weight of 161 to 300 $g/m^2$) as the recording material P is stored.

In the recording material conveyance portion 50, each of the recording materials P stored in each corresponding one of the cassettes is fed one by one from a predetermined cassette to a roller 53 through a roller 52 as a roller 51 rotates. With the rotation of the roller 53, the recording material P is conveyed to a secondary transfer portion Tr that is formed by the belt 17 and a secondary transfer roller 18, and a toner image is transferred onto the recording material P at the secondary transfer portion Tr. The recording material P on which an unfixed toner image is formed is fed to the fixing device (fixing unit) 20 and the toner image is heated and fixed onto the recording material P by the fixing device 20. The recording material P that is conveyed out of the fixing device 20 is discharged onto a tray 55 by rotation of a roller 54.

(2) Fixing Device 20

Figure 2:
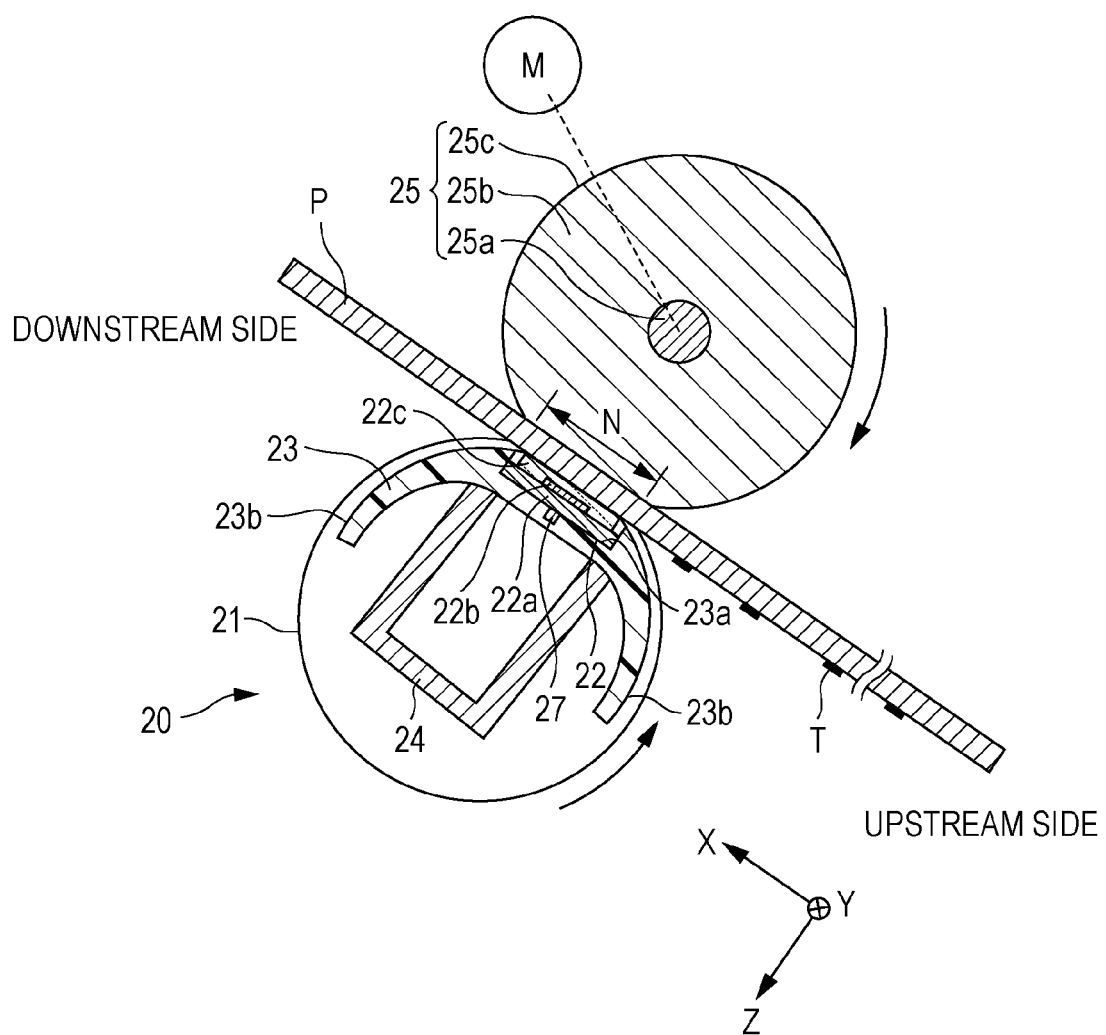
FIG. 2 is a sectional view illustrating a schematic configuration of a fixing device.
Figure 3:
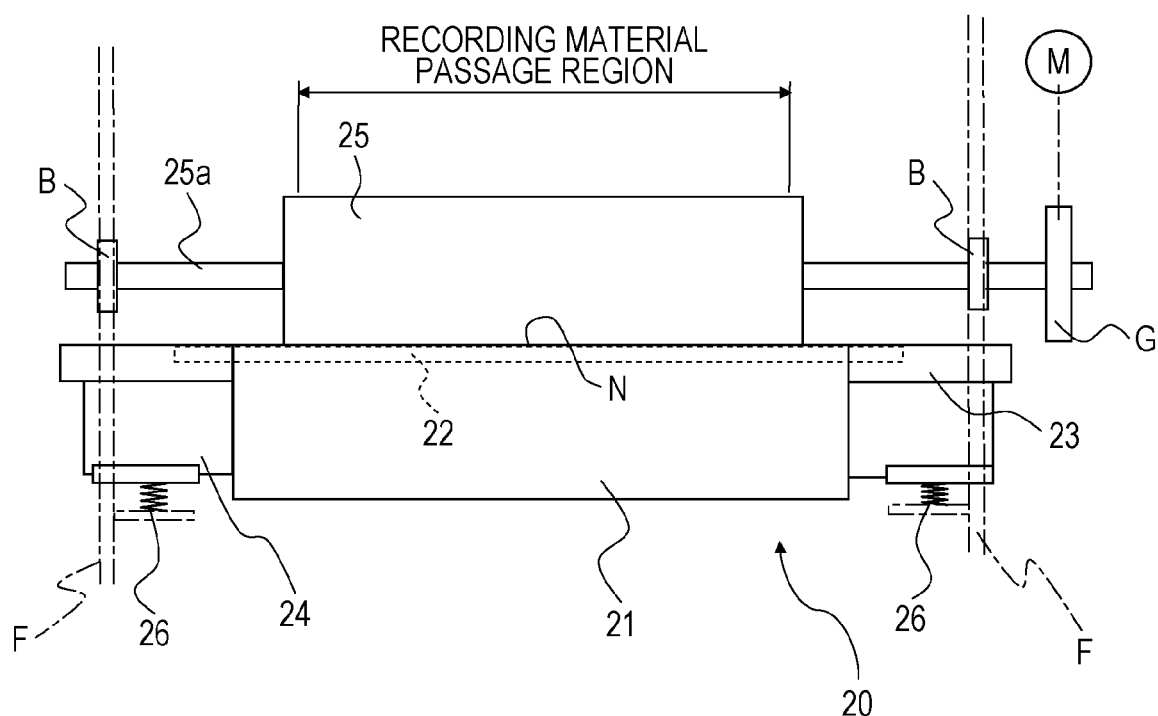
FIG. 3 illustrates the fixing device as viewed from an upstream side in a recording material conveying direction.

The fixing device 20 will be described with reference to FIGS. 2 and 3. The fixing device 20 indicated in the present embodiment is a device in a film heating type. FIG. 2 is a sectional view illustrating a schematic configuration of the fixing device 20. FIG. 3 illustrates the fixing device 20 as viewed from an upstream side in a recording material conveying direction X.

The fixing device 20 includes a heater 22 made of ceramic and serving as a heating member and a film (hereinafter, referred to as a sleeve) 21 having a cylindrical shape and serving as a fixing member that is heated by the heater 22. The fixing device 20 further includes a holder 23 as a support member that supports the heater 22, a pressing roller 25 as a nip portion forming member that forms a nip portion N with the sleeve 21 via the heater 22, and a stay 24 as a pressing member.

The heater 22 includes a substrate 22a that is elongated in a longitudinal direction Y orthogonal to the recording material conveying direction X. On a substrate surface of the substrate 22a on the pressing roller 25 side, a heat generating resistor 22b that generates heat upon energization is formed along the longitudinal direction of the substrate 22a. On the substrate surface, a protection glass layer 22c is formed so as to cover the heat generating resistor 22b. The substrate 22a is a thin plate using $Al_2O_3$. AlN is also usable as a material of the substrate 22a.

The heat generating resistor 22b is made by forming a pattern of heat generating resistor paste whose main component is Ag/Pd by screen printing or the like on the substrate surface. The heat generating resistor 22b is electrically connected to electrodes (not illustrated) provided inside both ends of the substrate 22a in the longitudinal direction Y orthogonal to the recording material conveying direction X.

The protection glass layer 22c is a glass coating layer that coats the heat generating resistor 22b in order to assure electrical insulation of the heat generating resistor 22b and in order to assure an abrasion resistance property relative to the sleeve 21.

The sleeve 21 has a SUS sleeve (base layer) that has a small heat capacity, heat resistance, thermo plasticity, and a thickness of 30 μm, and on an outer peripheral surface of the SUS sleeve, a thin elastic rubber layer that is obtained by molding silicone rubber, is heat resistive, and has a thickness of 300 μm is formed. As a material of the base layer of the sleeve 21, a resin film of polyimide, polyamidoimide, PEEK, PES, PPS, PFA, PTFE, FEP or the like, or a monolayer thin metal sleeve of SUS or the like is usable. As the thin elastic rubber layer, fluororubber or the like is usable. On the outer peripheral surface of the thin elastic rubber layer, a heat-resistant releasing layer made of fluororesin such as PFA, PTFE, or FEP may be formed.

The holder 23 supports the heater 22 by a groove 23a provided on a flat surface of the holder 23 on the pressing roller 25 side in the longitudinal direction Y orthogonal to the recording material conveying direction X. The sleeve 21 is externally fitted loosely around the outer periphery of the holder 23 that supports the heater 22. The holder 23 guides rotation of the sleeve 21 by a guide 23b that has an arc shape and is provided on an upstream side and a downstream side of the holder 23 in the recording material conveying direction X. On a flat surface of the holder 23 opposite to the pressing roller 25, the stay 24 made of metal for providing strength for the holder 23 is disposed in the longitudinal direction Y orthogonal to the recording material conveying direction X.

As the holder 23, one molded from PPS is used. A material of the holder 23 desirably has an excellent heat insulating property in order to prevent heat radiation to a side opposite to the nip portion N, and liquid crystal polymer, phenol resin, PEEK, or the like may be used, for example.

The pressing roller 25 includes a core metal 25a made of metal, an elastic layer 25b provided on an outer peripheral surface of the core metal 25a, and a releasing layer 25c provided on an outer peripheral surface of the elastic layer 25b. As a material of the elastic layer 25b, silicone rubber is used. A thickness of the silicone rubber is 3 mm. The material of the elastic layer 25b is not limited to silicone rubber and heat-resistant rubber such as fluororubber may be used. As a material of the releasing layer 25c, fluororesin such as PFA, PTFE, or FEP is used.

As illustrated in FIG. 3, both ends of the core metal 25a of the pressing roller 25 in the longitudinal direction Y orthogonal to the recording material conveying direction X are rotatably supported by right and left frames F of the fixing device 20 through bearings B. Both ends of the stay 24 and both ends of the holder 23 are supported by the right and left frames F. The both ends of the stay 24 are pressed by pressing springs 26 in a direction (recording material thickness direction Z) orthogonal to a generatrix direction of the sleeve 21.

The holder 23 pressed by the stay 24 presses the heater 22 against an inner peripheral surface (inner surface) of the sleeve 21 to bring an outer peripheral surface (front surface) of the sleeve 21 into pressure contact with an outer peripheral surface (front surface) of the pressing roller 25. Thereby, the elastic layer 25b of the pressing roller 25 is crushed to cause elastic deformation, so that the nip portion N with a predetermined width in the recording material conveying direction X is formed by the front surface of the pressing roller 25 and the front surface of the sleeve 21.

Figure 4:
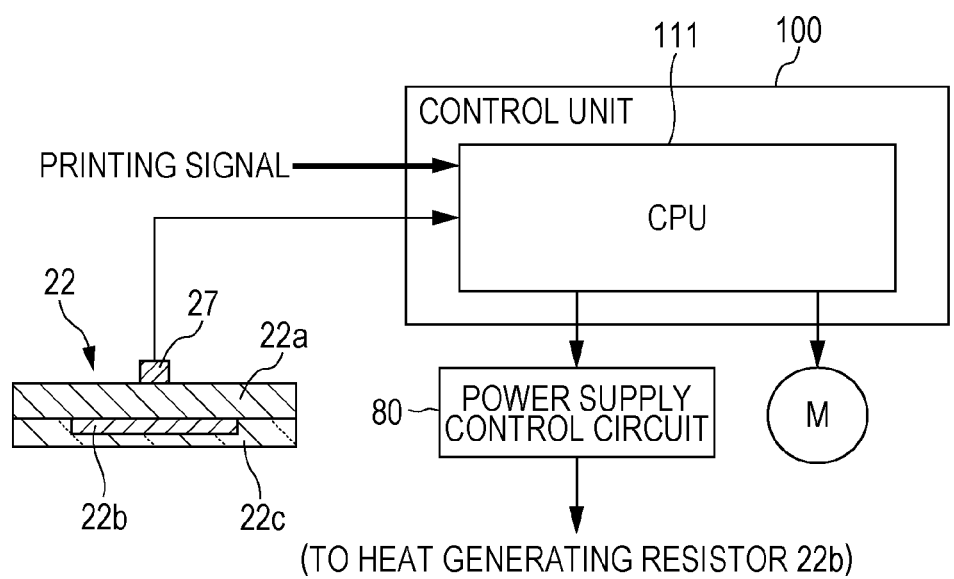
FIG. 4 is a block diagram of a control system of the fixing device.

A fixing processing operation of the fixing device 20 will be described with reference to FIGS. 2, 3, and 4. FIG. 4 is a block diagram of a control system of the fixing device 20.

In FIG. 4, a control unit 100 includes a CPU 111 and a memory (not illustrated) such as a RAM or a ROM. The CPU 111 drives a motor M in accordance with a printing signal to rotate a gear G (refer to FIG. 3) provided at an end of the core metal 25a of the pressing roller 25. Thereby, the pressing roller 25 rotates at a predetermined conveying speed (process speed) in an arrow direction illustrated in FIG. 2. The sleeve 21 rotates in an arrow direction illustrated in FIG. 2 by following the rotation of the pressing roller 25 while the inner surface of the sleeve 21 slides on the protection glass layer 22c of the heater 22.

The CPU 111 turns on a power supply control circuit 80 in accordance with the printing signal, so that the power supply control circuit 80 supplies power to the heat generating resistor 22b of the heater 22 through an electrode. Thereby, the heat generating resistor 22b is energized to generate heat, and the heater 22 heats, through the protection glass layer 22c, the sleeve 21 that is rotating. At this time, a temperature sensor 27 as a temperature detection member detects a temperature of the heater 22 in a recording material passage region and outputs the temperature to the CPU 111. The CPU 111 receives an output signal from the temperature sensor 27 and controls the power supply control circuit 80 on the basis of the output signal so that the temperature of the heater 22 keeps a predetermined fixing temperature (target temperature).

The recording material P that carries an unfixed toner image T is conveyed and heated by the nip portion N, so that the toner image is fixed onto the recording material P.

(3) Printing Setting Input Unit 70

The printing setting input unit 70 will be described with reference to FIG. 5. FIG. 5 illustrates printing setting of the printing setting input unit 70, which is able to be selected by a user. In FIG. 5, "A" corresponds to the first cassette C1, "B" corresponds to the second cassette C2, "C" corresponds to the third cassette C3, "D" corresponds to the fourth cassette C4, and "E" corresponds to the fifth cassette C5. A "paper type" corresponds to a type of the recording material P.

The printing setting input unit 70 disposed on a top part of the apparatus main body 1A as illustrated in FIG. 1 is used for the user to input printing setting of the recording material for each type of the recording material. That is, the printing setting input unit 70 enables the user to specify printing setting of the recording material P stored in each of the first to fifth cassettes. In FIG. 5, when the user selects any one of "thin paper", "plain paper", "thick paper 1", "thick paper 2", and "thick paper 3" in a field of the "paper type", a conveying speed and a fixing temperature that are recommended by a manufacture are set in accordance with the selected type of the recording material.

Here, the conveying speed is a speed at which the recording material P is conveyed by the nip portion N and the fixing temperature is a target temperature at which the toner image T is fixed to the recording material P by the nip portion N.

In a case where surface properties of recording materials P are equal, a recording material P having a larger basis weight requires more heat quantity to fix toner to the recording material P. Thus, as illustrated in FIG. 5, the conveying speed and the fixing temperature are set so that more heat quantity is provided per unit area of the recording material as the basis weight increases. Also in a case where basis weights of recording materials P are equal, the heat quantity provided per unit area of the recording material may be changed in accordance with a surface property of a recording material P. Though the conveying speed and the fixing temperature are set in accordance with the basis weight and the surface property of the recording material in the present embodiment, the conveying speed and the fixing temperature may be set in accordance with only the basis weight of the recording material.

(4) Recording Material Determination Device 60

Next, a recording material determination device 60 as a recording material determining unit will be described. As illustrated in FIG. 1, the recording material determination device 60 is disposed between the roller 53 of the recording material conveyance portion 50 and the secondary transfer portion Tr. The recording material determination device 60 includes a surface property detection unit 40 as a recording material detection unit, a basis weight detection unit 30, a surface property determination processing unit 45 as a determination processing unit, and a basis weight determination processing unit 90.

The surface property detection unit 40 detects the recording material P and outputs information (surface image of the recording material) for determining a type of the recording material and the basis weight detection unit 30 detects the recording material P and outputs information (transmission coefficient of the recording material) for determining the type of the recording material. The surface property determination processing unit 45 performs processing for determining the surface property of the recording material P and outputs a result of the processing and the basis weight determination processing unit 90 performs processing for determining the basis weight of the recording material P and outputs a result of the processing.

(4-1) Surface Property Detection Unit 40

Figure 6A:
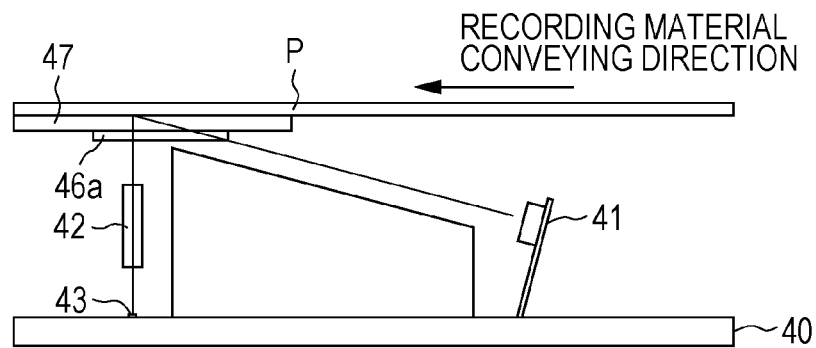
FIGS. 6A and 6B illustrate a schematic configuration of a surface property detection unit 40.
Figure 6B:
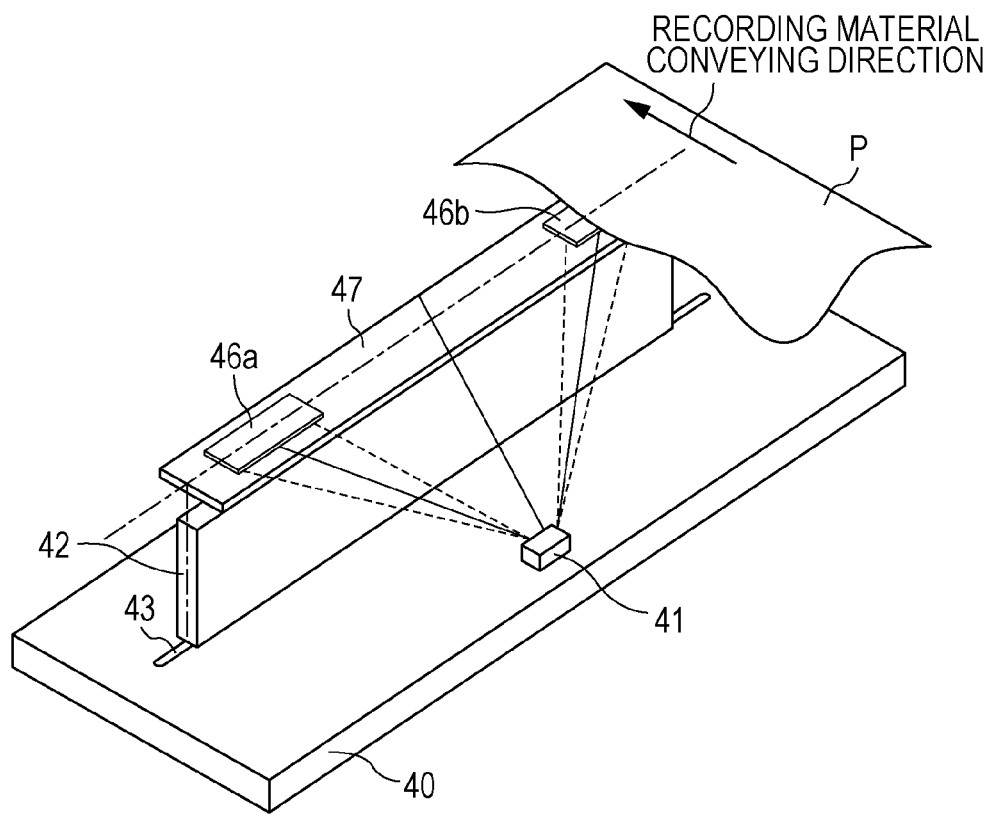

The surface property detection unit 40 will be described with reference to FIGS. 6A, 6B, 7, and 8. FIGS. 6A and 6B illustrate a schematic configuration of the surface property detection unit 40. FIG. 6A is a sectional view illustrating the schematic configuration of the surface property detection unit 40 and FIG. 6B is a perspective view of the surface property detection unit 40 as viewed from the upstream side in the recording material conveying direction.

The surface property detection unit 40 is disposed so as to face a recording material conveying path in a thickness direction of the recording material P as illustrated in FIG. 1. The surface property detection unit 40 has an LED 41 serving as an illumination unit that illuminates a surface of the recording material P with light. The LED 41 is arranged so as to illuminate the surface of the recording material P with light at an angle of substantially 10 degrees and generate brightness and darkness (shade) according to the surface property of the recording material P.

An imaging lens 42 serving as an imaging unit focuses a reflection light that is emitted from the LED 41 and reflected by the surface of the recording material P.

A line sensor 43 is a CMOS line sensor serving as an image capturing unit that captures an image of the light focused by the imaging lens 42. The line sensor 43 captures an image of the brightness and darkness (shade) generated on the surface of the recording material P.

Reference plates 46a and 46b (hereinafter, referred to as inner surface reference plates 46a and 46b) are positioned at ends of a region that is able to be illuminated with light from the LED 41.

A protection member 47 protects the imaging lens 42 and the LED 41.

As illustrated in FIG. 6B, the imaging lens 42 and the line sensor 43 are arranged so as to be orthogonal to the conveying direction of the recording material P. Thus, the line sensor 43 is able to simultaneously capture the image of the reflection light that is emitted from the LED 41 and reflected by the surface of the recording material P and the image of the reflection light that is emitted from the LED 41 and reflected by the inner surface reference plates 46a and 46b.

Figure 7:
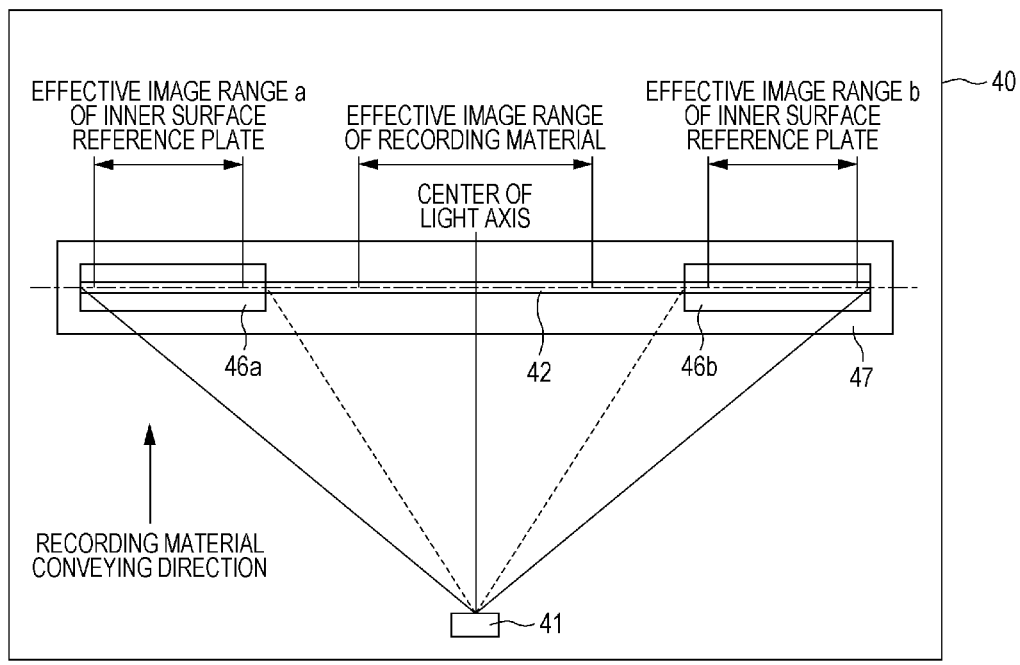
FIG. 7 illustrates illumination ranges of an LED of the surface property detection unit.

FIG. 7 illustrates illumination ranges of the LED 41 as viewed from an upper surface of the surface property detection unit 40. An effective image range of the recording material, an effective pixel range a of the inner surface reference plate, and an effective pixel range b of the inner surface reference plate, which are used for determining the surface property of the recording material P, are illustrated in FIG. 7.

Figure 8:
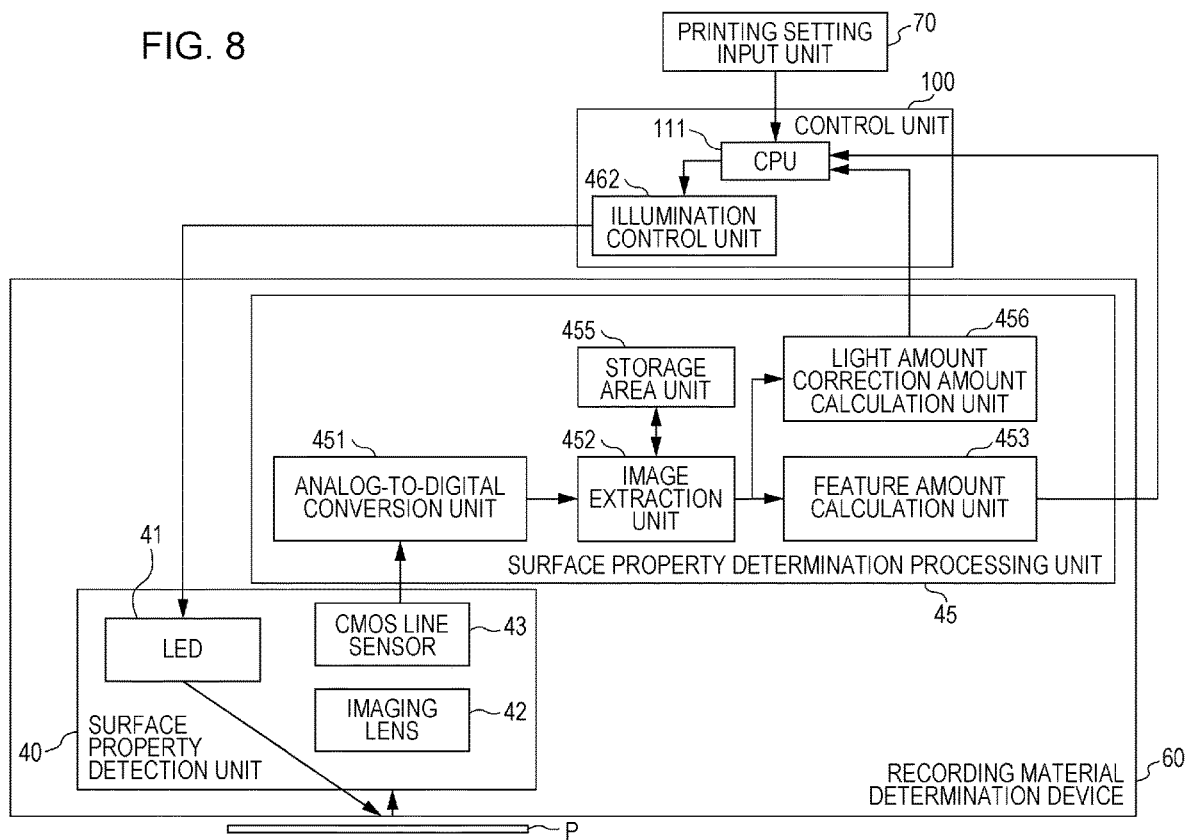
FIG. 8 is a control block diagram for explaining operations of a control unit, the surface property detection unit, and a surface property determination processing unit.

FIG. 8 is a control block diagram for explaining operations of the control unit 100, the surface property detection unit 40, and the surface property determination processing unit 45.

In the surface property detection unit 40, the LED 41 that is controlled by an illumination control unit 462 (described later) of the control unit 100 illuminates the surface of the recording material P that is conveyed with light. The image of the reflection light (brightness and darkness) from the recording material P is captured by the line sensor 43 through the imaging lens 42. The surface image of the recording material P, which is captured by the line sensor 43, is output to the surface property determination processing unit 45 as information for determining the type of the recording material.

The surface property determination processing unit 45 inputs the surface image of the recording material P from the line sensor 43, performs analog-to-digital conversion at an analog-to-digital conversion unit 451 for each pixel, and simultaneously reads an image on the same line orthogonal to the recording material conveying direction on a line-by-line basis. In the present embodiment, by using an 8-bit A-D conversion IC, the analog-to-digital conversion unit 451 outputs values from 0 to 255.

An image extraction unit 452 and a storage area unit 455 connect surface images of the recording material P from the line sensor 43 in the conveying direction to acquire a two-dimensional surface image. In the present embodiment, the conveying speed of the recording material P is set to 200 mm/second and resolution of the line sensor 43 is set to 600 dpi (42.3 μm per dot) of one line.

In the present embodiment, an image of an area corresponding to 5 mm×5 mm of the recording material P is captured. Thus, an image size is 118 dots×118 dots (600 dots×5 mm/25.4 mm). The image capturing of the line sensor 43 is performed at 42.3 μm (200 mm/second), that is, about at an interval of about 211 μsec. Thereby, images of areas for image capturing on the recording material P are able to be captured without overlapping.

On the basis of information of an effective image range of the recording material that is stored in the storage area unit 455 in advance, the surface image used for determining the type of the recording material P is extracted from the two-dimensional surface image that is obtained. A feature amount calculation unit 453 performs processing for calculating a feature amount in accordance with how the brightness and darkness are generated on the extracted surface image, and the CPU 111 of the control unit 100 determines the surface property of the recording material P on the basis of a result of the processing.

A current value for controlling the light emission of the LED 41 and a target value of a light amount required for adjusting the light amount described later are also stored in the storage area unit 455. The effective pixel range a of the inner surface reference plate and the effective pixel range b of the inner surface reference plate are also stored in the storage area unit 455.

The light amount of the LED 41 needs to be adjusted to accurately acquire the surface image of the recording material P. A reason for adjusting the light amount of the LED 41 is that, in a case where the light amount is excess, the reflection light from the recording material P increases and the acquired surface image is too bright, so that a feature amount (brightness and darkness) of the image may not be correctly obtained. The reason is also that, in a case where the light amount is insufficient, the acquired surface image is too dark, so that a feature amount (brightness and darkness) of the image may not be correctly obtained. Additionally, the light amount emitted from the LED 41 is reduced due to change with time.

Thus, before the surface image is captured, the adjustment is performed so that the LED 41 emits light with a light amount suitable for the image capturing. To finely control the reduction in the light amount, it is ideal to correct the light amount every time one recording material P is subjected to image capturing. Thus, in a time period during which the surface image of the recording material P is captured, a light amount correction amount calculation unit 456 detects also surface images of the inner surface reference plates 46a and 46b and outputs the surface images to the CPU 111. On the basis of a calculation result of the light amount correction amount calculation unit 456, the CPU 111 controls the illumination control unit 462 so as to achieve a predetermined light amount.

Next, a case where the conveying speed of the recording material P becomes half (100 mm/second) will be described. To perform image capturing with 600 dpi in the conveying direction while the conveying speed is 100 mm/second, the line sensor 43 needs to perform image capturing at 42.3 μm/(100 mm/second), that is, at an interval of about 423 μsec. That is, time for the image capturing is twice as long as that in a case where the conveying speed is 200 mm/second. On the other hand, it is desired that the same image capturing result (integral amount of light received by the line sensor 43) for brightness and darkness (shade) generated on the surface of the recording material P is obtained regardless of the conveying speed.

Thus, control is performed so that the same image capturing result is obtained also when the image capturing time becomes twice by reducing the amount of light with which the recording material P is illuminated to half. In the present embodiment, in accordance with the conveying speed of the recording material P, the light amount correction amount calculation unit 456 performs correction to the light amount according to the conveying speed.

Though a method of determining the surface property of the recording material P by using the line sensor has been described above, such description is given with a line sensor having a general configuration. The configuration of the line sensor 43, for example, such as positions or presence/absence of the inner surface reference plates 46a and 46b, or the number of LEDs 41, is not limited to the aforementioned configuration.

(4-2) Basis Weight Detection Unit 30

Figure 9:
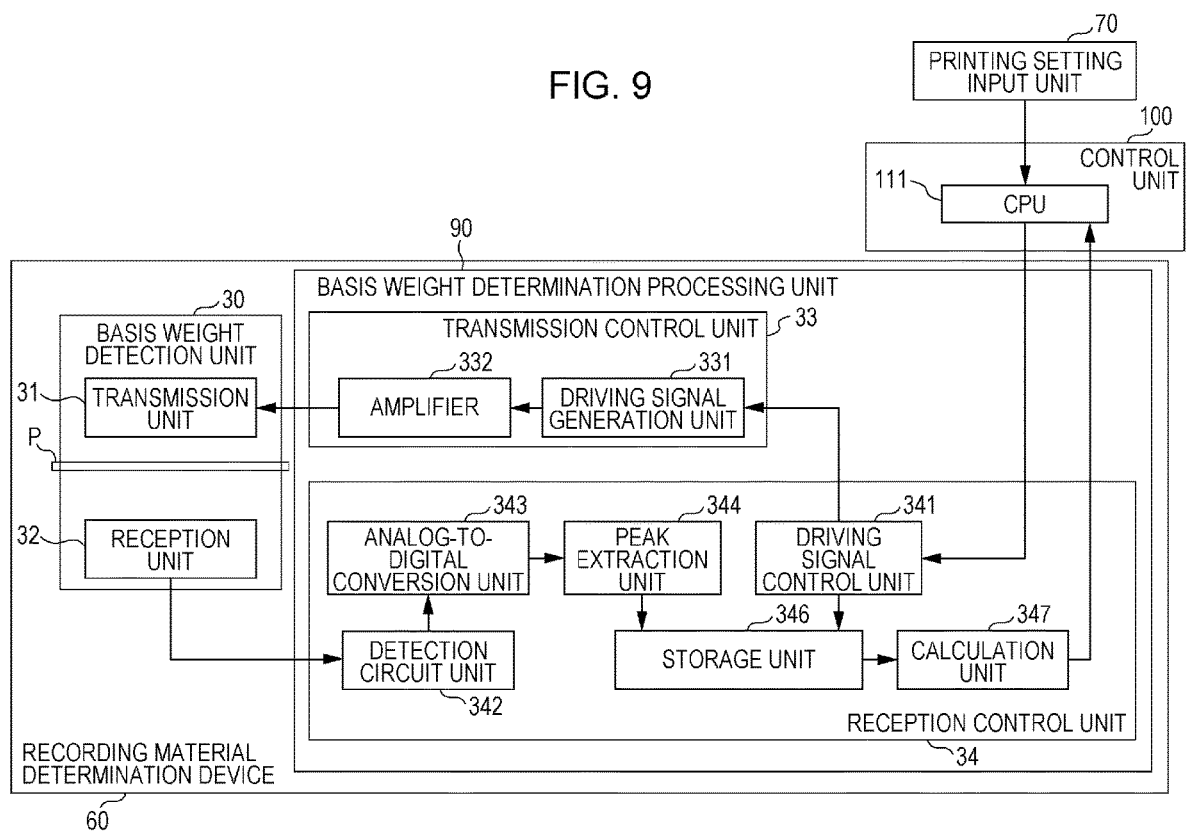
FIG. 9 is a control block diagram for explaining operations of the control unit, a basis weight detection unit, and a basis weight determination processing unit.

The basis weight detection unit 30 will be described with reference to FIG. 9. FIG. 9 is a control block diagram for explaining operations of the control unit 100, the basis weight detection unit 30, and the basis weight determination processing unit 90.

The basis weight detection unit 30 includes a transmission unit 31 and a reception unit 32. The transmission unit 31 and the reception unit 32 are arranged with the recording material conveying path held therebetween as illustrated in FIG. 1. The basis weight determination processing unit 90 that performs transmission or reception of an ultrasonic wave and processing for determining the basis weight of the recording material P includes a transmission control unit 33 and a reception control unit 34. The basis weight herein is a mass per unit area of the recording material P and is represented as [g/m$^2$].

In the basis weight detection unit 30, the transmission unit 31 and the reception unit 32 have similar configurations and each of them is constituted by a piezoelectric element serving as an interconversion element of a mechanical displacement and an electric signal, and an electrode terminal.

In the transmission unit 31, when a pulse voltage at a predetermined frequency is input to the electrode terminal, the piezoelectric element oscillates to generate an acoustic wave and the acoustic wave propagates through the air. When the acoustic wave reaches the recording material P, the recording material P is oscillated by the acoustic wave. The acoustic wave generated in the transmission unit 31 is propagated to the reception unit 32 through the recording material P. The piezoelectric element of the reception unit 32 causes the electrode terminal to generate an output voltage according to an amplitude of the received acoustic wave. This is the principle of an operation in a case where the ultrasonic wave is transmitted and received by using the piezoelectric elements.

In the present embodiment, the transmission unit 31 and the reception unit 32 transmit and receive the ultrasonic wave with a frequency characteristic of 32 kHz. The frequency of the ultrasonic wave is set in advance, and a frequency in an appropriate range may be selected in accordance with the configurations of the transmission unit 31 and the reception unit 32, a detection accuracy, and the like.

An operation of basis weight determination processing will be described.

A signal indicating measurement start is input from the CPU 111 to a driving signal control unit 341 of the reception control unit 34. When the signal is input, the driving signal control unit 341 notifies a driving signal generation unit 331 of the transmission control unit 33 of generation of an ultrasonic wave transmission signal so as to transmit the ultrasonic wave at a predetermined frequency.

The driving signal generated by the driving signal generation unit 331 outputs a pulse wave at a fixed cycle so that influence of disturbance of a reflected wave or the like by the recording material P or a member around the recording material conveying path is reduced and only a direct wave emitted from the transmission unit 31 is able to be received by the reception unit 32. Such a signal is called a burst wave. In the present embodiment, five pulses of a pulse wave at 32 [kHz] are continuously output in a single measurement.

The driving signal generation unit 331 generates the driving signal having a frequency that is set in advance and outputs the driving signal. An amplifier 332 amplifies a level (voltage value) of the signal input from the driving signal generation unit 331, and outputs the driving signal to the transmission unit 31. The reception unit 32 receives an ultrasonic wave transmitted from the transmission unit 31 or an ultrasonic wave transmitted by the recording material P, and outputs the ultrasonic wave to a detection circuit unit 342 of the reception control unit 34 as information for determining the type of the recording material.

The detection circuit unit 342 has a function of amplifying a signal and a function of rectifying a signal, so that an amplification factor is variable between a state where the recording material P does not exist between the transmission unit 31 and the reception unit 32 and a state where the recording material P exists. The signal generated by the detection circuit unit 342 is converted from an analog signal to a digital signal by the analog-to-digital conversion unit 343.

A peak extraction unit 344 extracts a peak (local maximal value) of the signal on the basis of the converted digital signal and the value (peak value) is stored in a storage unit 346. The aforementioned sequential processing from processing of the peak extraction unit 344 to processing of the storage unit 346 is referred to as a "peak detection operation". The peak detection operation is performed the predetermined number of times at a predetermined interval in both the state where the recording material P does not exist between the transmission unit 31 and the reception unit 32 and the state where the recording material P exists.

A calculation unit 347 performs processing for calculating a transmission coefficient from a ratio between an average value of the predetermined number of times in the state where the recording material P does not exist and an average value of the predetermined number of times in the state where the recording material P exists. The transmission coefficient is a value corresponding to the basis weight, and the CPU 111 of the control unit 100 determines the basis weight of the recording material P on the basis of the transmission coefficient calculated by the calculation unit 347.

The control unit 100 determines the type of the recording material P on the basis of the processing results of the surface property determination processing unit 45 and the basis weight determination processing unit 90 described above.

A method of determining the type of the recording material P by the control unit 100 on the basis of the processing results of the surface property determination processing unit 45 and the basis weight determination processing unit 90 has been described above, but the method of determining the type of the recording material is not limited to the aforementioned method. Other methods, such as a method of detecting the basis weight of the recording material P from power consumption of the fixing device 20 during the fixing processing operation and a method of detecting the basis weight of the recording material P from a temperature difference between the sleeve 21 and the heater 22 during the fixing processing operation, may be used. That is, information for determining the type of the recording material P may include any one or both of the surface property and the basis weight of the recording material.

(5) Method of Deciding Printing Setting

In a memory (not illustrated) of the control unit 100, for each type of the recording material P, printing setting suitable for the type of the recording material is stored in accordance with a combination of a feature amount of the surface property of the recording material and the transmission coefficient that is a value corresponding to the basis weight of the recording material. The CPU 111 determines the type of the recording material on the basis of the processing results of the surface property determination processing unit 45 and the basis weight determination processing unit 90 as described above.

Then, the CPU 111 compares printing setting (hereinafter, referred to as printing setting recommended by the manufacturer) suitable for the determined type of the recording material P and printing setting input by the user with use of the printing setting input unit 70. In a case where a difference between the printing setting recommended by the manufacturer and the printing setting input by the user is in a predetermined range, a printing operation is performed in accordance with the printing setting input by the user. In a case where the difference falls outside the predetermined range, the printing operation is performed by changing the printing setting input by the user, which is used when the difference in the predetermined range.

With reference to FIGS. 10 and 11, a method of deciding printing setting by comparison between the "printing setting recommended by the manufacturer" and the "printing setting input by the user" will be described.

FIG. 10 illustrates a gap between the "printing setting recommended by the manufacturer" and the "printing setting input by the user" and setting is performed in such a manner that a heat quantity provided per unit area of the recording material P increases by 10% in order from A to E. In the memory of the control unit 100, information about a magnitude relationship of heat quantities provided per unit area of the recording material P in all the printing setting is stored in advance.

In FIG. 10, ○ indicates that the "printing setting recommended by the manufacturer" matches the "printing setting input by the user". Moreover, Δ indicates that, in a case where the printing setting is arranged in order of the heat quantity provided per unit area of the recording material P, there is a gap of 1 between the "printing setting recommended by the manufacturer" and the "printing setting input by the user", and x indicates that the gap is 2 to 3 and xx indicates that the gap is 4. Here, Δ corresponds to a case where a difference between the "printing setting recommended by the manufacturer" and the "printing setting input by the user" falls in a predetermined range. On the other hand, x and xx correspond to a case where the difference between the "printing setting recommended by the manufacturer" and the "printing setting input by the user" falls outside the predetermined range.

FIG. 11 illustrates generating phenomena of fixing failure of a toner image or recording material winding (hereinafter, referred to as winding) around the sleeve 21 in a case where the printing operation is performed with the present "printing setting input by the user" in each of the states of ○, Δ, x, and xx illustrated in FIG. 10.

In FIG. 11, ○ indicates that the recording material P is able to be conveyed by the nip portion N without generation of fixing failure or winding. Moreover, x and xx indicate that there is a possibility that fixing failure or winding is generated. Probability of generating fixing failure or winding is higher in xx than the case of x. Thus, in x and xx, a change needs to be made to the "printing setting input by the user" while influence on image quality is suppressed to a minimum.

In x and xx in the lower left of FIG. 11, when the fixing processing operation of the fixing device 20 is performed by using the "printing setting input by the user", the heat quantity for the recording material P becomes excess and probability of generating winding of the recording material P around the sleeve 21 due to excessive fixation of a toner image is high (case1).

The winding is likely to be generated in a case where the first recording material is subjected to fixing processing for the sleeve 21 first in the morning when the temperature of the pressing roller 25 is low while the recording material is conveyed by the nip portion N. This is because, when there is a difference between the temperature of the sleeve 21 that contacts a toner image formation surface of the recording material P and the temperature of the pressing roller 25 that contacts a toner image non-formation surface, moisture contained in the recording material is discharged in a different manner between the toner image formation surface and the toner image non-formation surface.

Thus, a time from when power is started to be supplied to the heater 22 until the first recording material P is started to be conveyed by the nip portion N when a toner image is fixed to the first recording material P is extended than a normal time. In the present embodiment, by rotating the pressing roller 25 and the sleeve 21 for a predetermined time before the fixing processing operation starts, the time till when the first recording material P is started to be conveyed by the nip portion N is extended (hereinafter, referred to as extension of a pre-rotation operation) than the normal time. Thereby, the heat of the sleeve 21 is transmitted to the pressing roller 25 to increase the temperature of the pressing roller 25, thus making it possible to reduce possibility of winding around the sleeve 21.

In a case where printing is performed continuously, even when the pre-rotation operation is extended before the first recording material P is printed, the temperature of the pressing roller 25 is reduced due to fixing of the toner image to the first recording material P and the pre-rotation operation needs to be extended before the second recording material is printed in some cases.

In such a case, the temperature of the pressing roller 25 may be increased by performing a post-rotation operation after the first recording material P is printed and then performing printing for the second recording material. Here, the post-rotation operation means that the pressing roller 25 and the sleeve 21 are rotated for a predetermined time after the fixing processing operation ends. Thereby, the heat of the sleeve 21 is transmitted to the pressing roller 25 to increase the temperature of the pressing roller 25, thus making it possible to reduce possibility of winding of the second recording material around the sleeve 21.

In a case where there is a gap of 2 to 3 between the "printing setting recommended by the manufacturer" and the "printing setting input by the user" as indicated with x in the lower left of FIG. 11 (x of case1), the pre-rotation operation is extended and the printing operation is performed by using the "printing setting input by the user" (mode1 in FIG. 12). In this case, the conveying speed at which the recording material P is conveyed by the nip portion N or the fixing temperature at which the toner image is fixed to the recording material P is not changed, so that image quality required by the user is able to be obtained.

In a case where there is a gap of 4 between the "printing setting recommended by the manufacturer" and the "printing setting input by the user" as indicated with xx in the lower left of FIG. 11 (xx of case1), probability of generating winding is high only by extending the pre-rotation operation. Thus, the pre-rotation operation is extended and the fixing temperature (target temperature) is set to be low compared to the case of the "printing setting input by the user" (mode2 in FIG. 12). Thereby, the heat quantity provided per unit area of the recording material P is able to be reduced, thus making it possible to reduce possibility of winding around the sleeve 21 due to excessive fixation of toner.

In x and xx in the upper right of FIG. 11, when the printing operation is performed continuously by using the "printing setting input by the user", fixing failure is generated due to lack of the heat quantity for the recording material P, so that contamination is generated in the recording material conveying path on and after the fixing device 20 (case2). Thus, a recording material supply interval (hereinafter, referred to as an output interval) when the recording material P is continuously supplied by the recording material conveyance portion 50 to the image forming portion 10 is made wider than a normal interval (mode3 and mode4 in FIG. 12). Thereby, a heat accumulation effect to the pressing roller 25 between recording materials after a rear end of the preceding recording material P passes through the nip portion till when a front end of a subsequent recording material reaches the nip portion is enhanced, thus making it possible to reduce possibility of fixing failure.

In a case where there is a gap of 2 to 3 between the "printing setting recommended by the manufacturer" and the "printing setting input by the user" as indicated with x in the upper right of FIG. 11 (x of case2), the printing operation is performed by using the "printing setting input by the user" with the output interval wider than a normal interval (mode3 in FIG. 12). In this case, the conveying speed at which the recording material P is conveyed by the nip portion N or the fixing temperature at which the toner image is fixed to the recording material P is not changed, so that image quality required by the user is able to be obtained.

In a case where there is a gap of 4 between the "printing setting recommended by the manufacturer" and the "printing setting input by the user" as indicated with xx in the upper right of FIG. 11 (xx of case2), fixing failure is generated only by making the output interval wider than a normal interval. Thus, the output interval is made wider and the fixing temperature is set to be high compared to the case of the "printing setting input by the user" (mode4 in FIG. 12). Thereby, the heat quantity provided per unit area of the recording material P is able to be increased, thus making it possible to reduce possibility of fixing failure due to lack of the heat quantity.

As a method of increasing the heat quantity provided per unit area of the recording material P, the fixing temperature may be set to be high. As another method, for example, a printing speed is set to be low or changing of the printing speed and changing of the fixing temperature may be combined.

FIG. 12 illustrates an effect in a case where the printing operation is changed in accordance with a difference between the "printing setting recommended by the manufacturer" and the "printing setting input by the user". With the "printing setting input by the user", ten sheets of each of thin paper, plain paper, thick paper 1, thick paper 2, and thick paper 3 are caused to pass through the nip portion N continuously and whether or not fixing failure or winding is generated is checked.

In a case where the difference between the "printing setting recommended by the manufacturer" and the "printing setting input by the user" falls outside a predetermined range, the printing operation of the "printing setting input by the user" is changed (mode1 to mode4). Thereby, fixing failure or winding is not generated in any combinations and convenience is significantly improved compared to a case where the printing operation is performed with the present "printing setting input by the user" illustrated in FIG. 11.

As described above, in a case where the difference between the "printing setting recommended by the manufacturer" and the "printing setting input by the user" falls outside the predetermined range, the image forming apparatus 1 according to the present embodiment changes the printing operation of the "printing setting input by the user". Thereby, even in a case where image quality required by the user and image quality recommended by the manufacturer are different, the user is able to obtain image quality required by the user. Further, the image forming apparatus 1 of the present embodiment is able to suppress generation of fixing failure or winding while giving priority to the image quality required by the user as much as possible.

Other Embodiments

The fixing device 20 is not limited to a film heating type. As the fixing device 20, a device in a heat roller type, which includes a roller having a cylindrical shape and serving as a fixing member, a halogen lamp as a heating member that heats the roller, and a pressing roller as a nip portion forming member that forms a nip portion together with the roller, may be used. Alternatively, a device in an electromagnetic induction heating type, which includes a sleeve as a fixing member that has a cylindrical shape and is made of metal, a coil as a heating member that causes the sleeve to generate heat by electromagnetic induction, and a pressing roller as a nip portion forming member that forms a nip portion with the sleeve, may be used as the fixing device.

Embodiment 2

Figure 13:
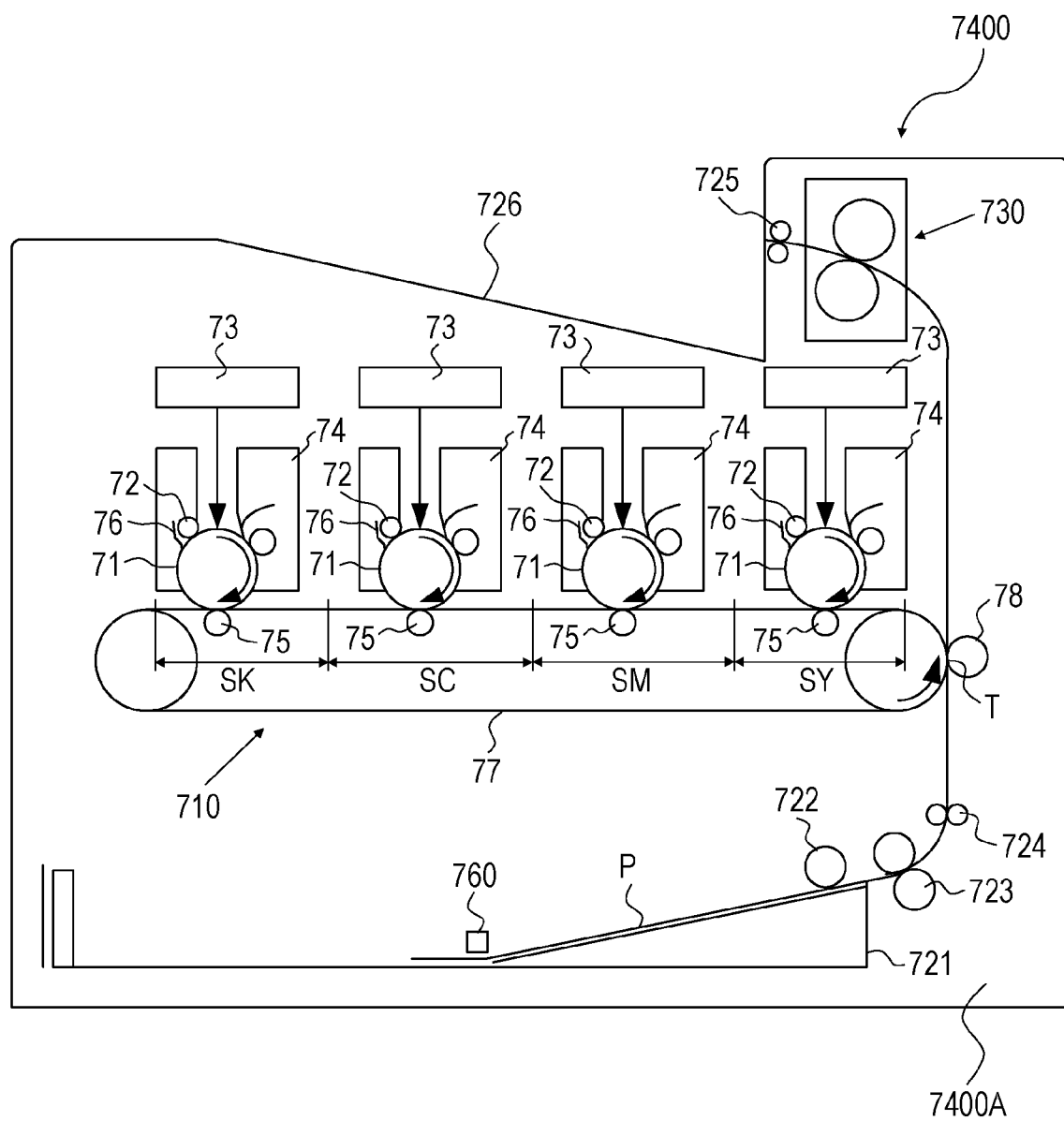
FIG. 13 is a sectional view illustrating a schematic configuration of an image forming apparatus according to Embodiment 2.

<Image Forming Apparatus 7400>
With reference to FIG. 13, an image forming apparatus 7400 according to the invention will be described. FIG. 13 is a sectional view illustrating an example of a schematic configuration of the image forming apparatus (full color printer in the present embodiment) 7400 using an electrophotographic recording technique.

The image forming apparatus 7400 includes an image forming portion 710 and a fixing device (fixing portion) 730.

The image forming portion 710 that forms an image on a recording material P by using toner includes four image forming stations SY, SM, SC, and SK for yellow, magenta, cyan, and black. The image forming stations have photosensitive drums (image carrying members) 71, charging members 72, laser scanners 73, development units 74, transfer members 75, and cleaners 76 that clean outer peripheral surfaces of the photosensitive drums 71. The image forming portion 710 further includes a belt 77 that conveys toner images transferred from the respective photosensitive drums 71 by the transfer members 76 while carrying the toner images, and a secondary transfer member 78 that transfers the toner images from the belt 77 to the recording material P.

The image formation operation of the image forming portion 710 for the recording material described above is widely known, so that detailed description thereof will be omitted.

In a cassette (storage portion) 721 provided in an apparatus main body 7400A, the recording material P such as narrow-width paper, wide-width paper, thick paper, or plain paper is stored, and a size of the recording material is detected by a size sensor 760 provided in the cassette 721. Each recording material P stored in the cassette 721 is fed one by one to a roller 724 through a roller 723 as a roller 722 rotates. With the rotation of the roller 724, the recording material P is conveyed to a transfer portion T between the belt 77 and the secondary transfer member 78, and an unfixed toner image (unfixed image) is transferred onto the recording material P at the transfer portion T.

The recording material P on which the unfixed toner image is formed is provided to the fixing unit (fixing portion) 730 and the toner image is heated and fixed onto the recording material P by the fixing unit 730. The recording material P that is conveyed out of the fixing unit 730 is discharged onto a tray 726 by rotation of a roller 725.

Figure 14:
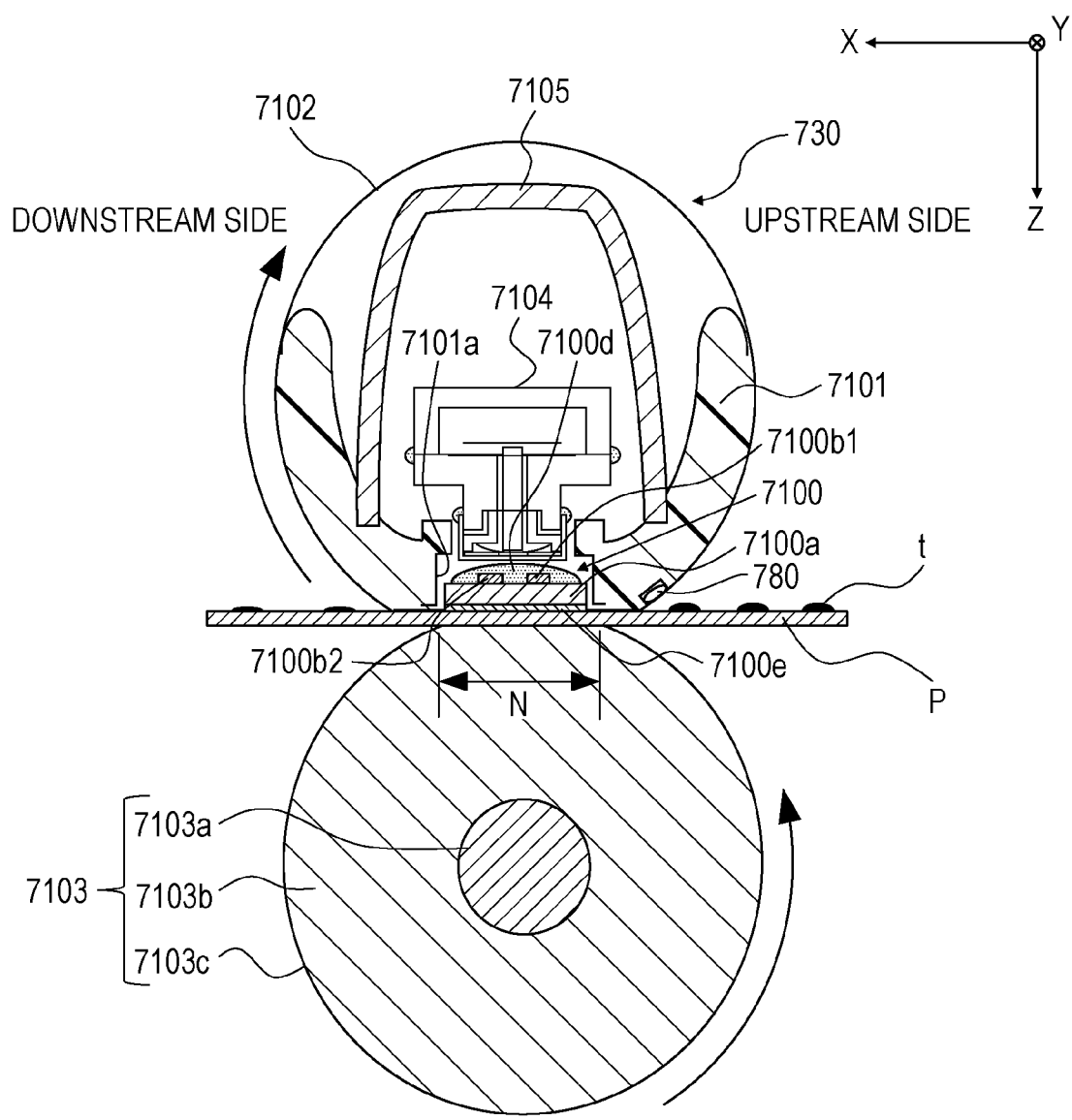
FIG. 14 is a sectional view illustrating a schematic configuration of a fixing device.

<Fixing Unit (Fixing Portion) 730>
The fixing unit 730 will be described with reference to FIGS. 14 and 15. FIG. 14 is a sectional view illustrating a schematic configuration of the fixing unit 730. FIG. 15 illustrates the fixing unit 730 as viewed from an upstream side in the recording material conveying direction X. The fixing unit 730 is a fixing unit in a film heating type.

The fixing unit 730 includes a heater (heating member) 7100 made of ceramic, a holder (support member) 7101, a film (fixing member) 7102 in a cylindrical shape, a pressing roller (nip portion forming member) 7103, and a stay (reinforcing member) 7105.

The film 7102 that is heat resistant and flexible has a layer thickness of 80 μm in order to enable quick start. The film 7102 has a base layer and a releasing layer which is provided on an outer peripheral surface of the base layer. As a material of the base layer, a heat-resistant resin material of polyimide, polyamidoimide, or the like is usable. As a material of the releasing layer, heat-resistant resin materials which have good releasability, such as fluororesin materials of PTFE, PFA, or the like, or silicone resin materials, are able to be used in mixture or singly to coat the outer peripheral surface of the base layer.

The holder 7101 inserted in a hollow portion of the film 7102 is a member that supports the heater 7100. The holder 7101 also has a function of guiding rotation of the film 7102. The holder 7101 is formed of heat-resistant resin such as liquid crystal polymer or phenolic resin. On a flat surface of the holder 7101 on the roller 7103 side, a groove 7101a is provided along the direction Y orthogonal to the recording material conveying direction X and the heater 7100 is supported by the groove 7101a.

Figure 16A:
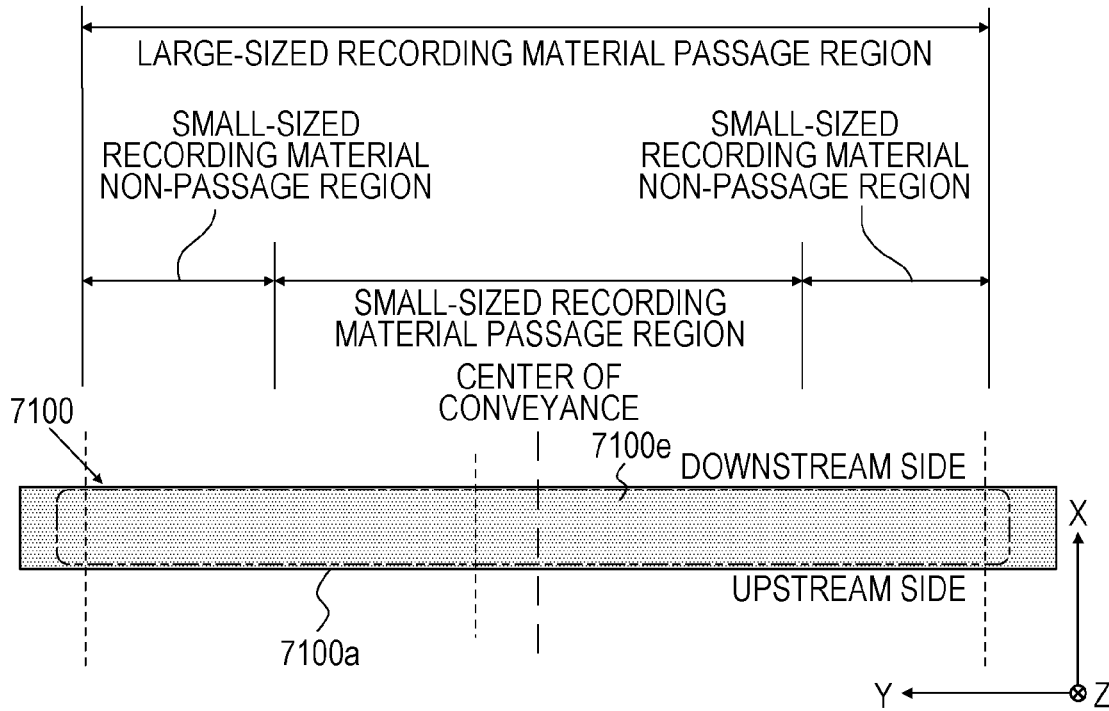
FIGS. 16A and 16B illustrate a schematic configuration of a heater.
Figure 16B:
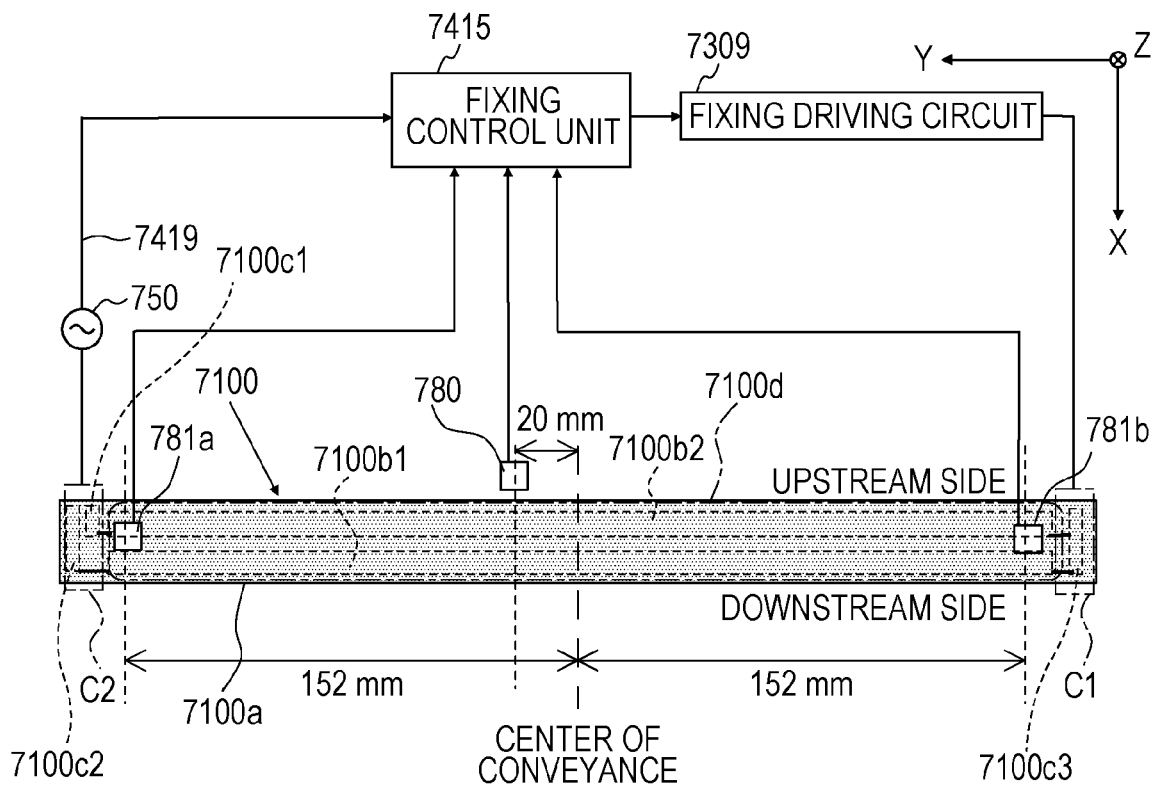

The heater 7100 will be described with reference to FIGS. 16A and 16B. FIG. 16A illustrates a schematic configuration of the heater 7100 on the roller 7103 side and FIG. 16B illustrates a schematic configuration of the heater 7100 on the opposite side of the roller 7103.

The heater 7100 includes a substrate 7100a that is elongated and made of ceramic such as alumina or aluminum nitride. On a flat surface of the substrate 7100a on the opposite side of the roller 103, first and second heat generating elements 7100b1 and 7100b2 that generate heat upon energization are provided along a longitudinal direction of the substrate 7100a at one end and the other end of the substrate 7100a in the recording material conveying direction X. In the direction Y orthogonal to the recording material conveying direction X, heat generation distribution per unit area is equal between the heat generating elements 7100b1 and 7100b2 made of Ag/Pd(silver-palladium) or $Ta_2N$.

On the aforementioned flat surface, an electrode 7100c1 for feeding power to the heat generating element 7100b1, an electrode 7100c2 for feeding power to the heat generating element 7100b2, a common electrode 7100c3 for feeding power to the respective heat generating resistors, and a protection layer 7100d for assuring protection and insulation of the respective heat generating resistors are further provided. In the present embodiment, the protection layer 7100d is a glass layer.

On the other hand, on a flat surface of the substrate 7100a on the roller 7103 side, a sliding layer (in the present embodiment, glass layer) 7100e for reducing a frictional force between the flat surface and an inner peripheral surface (inner surface) of the film 7102 is provided.

In the direction Y orthogonal to the recording material conveying direction X, thermistors (temperature detecting units) 781a and 781b for detecting temperature rising in a non-passage region of the film 7102 contact a surface of the protection layer 7100d of the heater 7100 at both ends in a large-sized recording material passage region. Surfaces of the respective thermistors 781a and 781b on the opposite side of the protection layer 7100d contact a heat-sensitive surface of a temperature protection element 7104 (refer to FIG. 14). Each of the thermistors 781a and 781b is away from a center of conveyance of the recording material P by 152 mm and is at a position in the non-passage region at a time of lateral feeding of A4 paper (A4 width of 297 mm) or lateral feeding of letter paper (letter width of 279 mm).

In the present embodiment, the thermistors 781a and 781b are arranged at positions where high productivity is able to be kept by lateral feeding of A4 paper with a width of a large-sized recording material passage region as 320 mm, but the positions where the thermistors 781a and 781b are arranged are not limited to the positions in the present embodiment.

In the direction Y orthogonal to the recording material conveying direction X, a thermistor (temperature detecting unit) 780 for temperature control contacts the inner surface of the film 7102 in a small-sized recording material passage region. The thermistor 780 is supported by the holder 7101 (refer to FIG. 14). The thermistor 780 is away from the center of conveyance of the recording material P by 20 mm and is at a position in the passage region at a time of conveyance of a small-sized recording material.

The roller 7103 includes a core metal 7103a made of metal, a roller portion (elastic layer) 7103b provided on an outer peripheral surface of the core metal 7103a, and a releasing layer 7103c provided on an outer peripheral surface of the roller portion 7103b. The roller portion 7103b is formed of heat-resistant rubber such as silicone rubber or fluororubber or formed by foaming silicone rubber. The releasing layer 7103c is formed of fluororesin such as PTFE or PFA. In the direction Y orthogonal to the recording material conveying direction X, both ends of the core metal 7103a are supported rotatably by frames 7108 of the fixing unit 730 through bearings 7107 (refer to FIG. 15).

The stay 7105 that is inserted in a hollow portion of the film 7102 is disposed on a surface of the holder 7101 on an opposite side of the roller 7103. In the direction Y orthogonal to the recording material conveying direction X, both ends of the stay 7105 are supported by the frames 7108. The stay 7105 has a function of reinforcing the holder 7101.

As illustrated in FIG. 15, the both ends of the stay 7105 are pressed by a pressing spring 7109 in the recording material thickness direction Z. The stay 7105 brings the holder 7101 into pressure contact with the inner surface of the film 7102 with pressure of the spring 7109. Thereby, the roller portion 7103b of the roller 7103 is crushed to cause elastic deformation, so that the nip portion N with a predetermined width in the recording material conveying direction X is formed by an outer peripheral surface (front surface) of the roller portion 7103b and an outer peripheral surface (front surface) of the film 7102.

<Heat Fixing Processing Operation>

A heat fixing processing operation of the fixing unit 730 will be described with reference to FIGS. 14, 15, 16A, and 16B.

A driving force of a motor M (refer to FIG. 15) is transmitted to the core metal 7103a of the roller 7103 through a gear G and the roller 7103 thereby rotates in an arrow direction illustrated in FIG. 14. The film 7102 rotates in an arrow direction illustrated in FIG. 14 by following the rotation of the roller 7103 while an inner surface of the film 7102 contacts the sliding layer 7100e of the heater 7100.

When power is supplied from an AC power supply 750 to the electrodes 7100c1, 7100c2, and 7100c3 for the heat generating elements 7100b1 and 7100b2 of the heater 7100 through connectors C1 and C2, the heat generating elements 7100b1 and 7100b2 generate heat and the heater 7100 quickly raises temperature. A fixing control unit 7415 controls an energization timing to a fixing driving circuit 7309 so that temperature at the inner surface of the film 7102, which is detected by the thermistor 780, keeps a predetermined target temperature (fixing temperature).

The recording material P on which the unfixed toner image t is formed is heated while being pinched and conveyed by the nip portion N, and the toner image is thereby fixed onto the recording material P.

<System Configuration of Image Forming Apparatus 7400>

Figure 17:
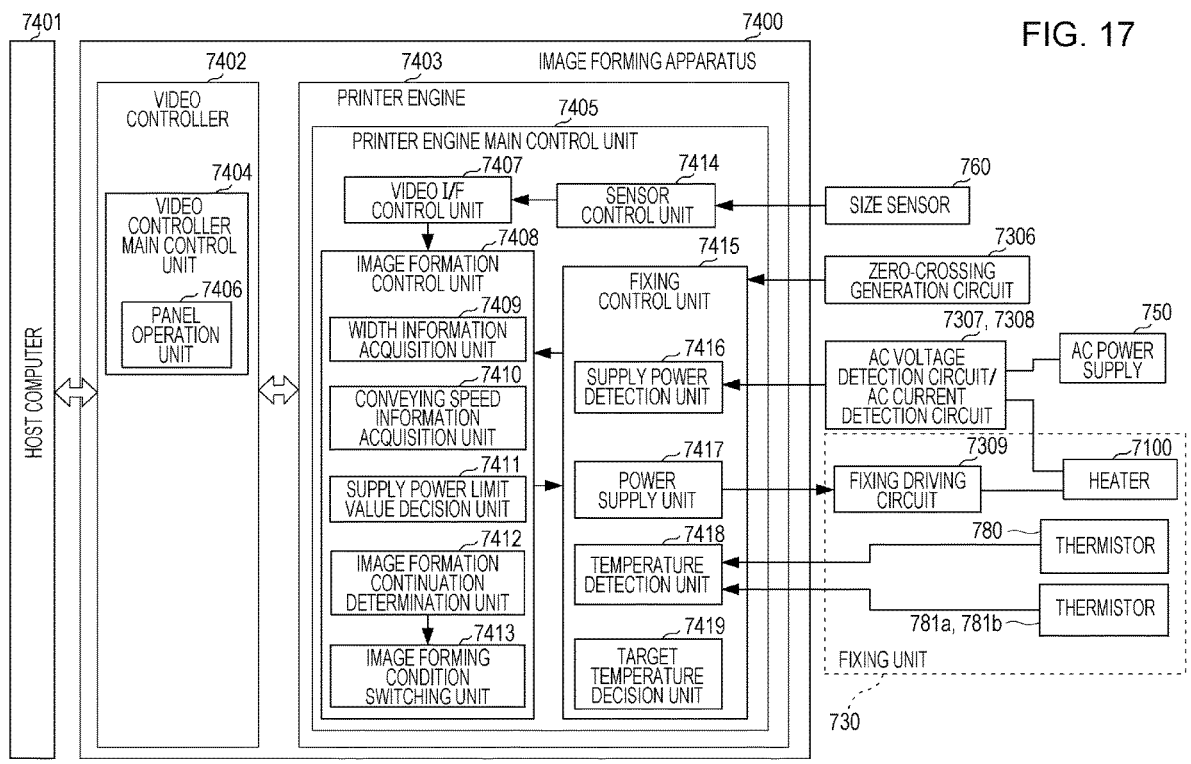
FIG. 17 illustrates a system configuration of the image forming apparatus.

FIG. 17 is a block diagram illustrating a system configuration of the image forming apparatus 7400.

The image forming apparatus 7400 includes a video controller 7402 constituted by a CPU and a memory such as a ROM or a RAM, and a printer engine 7403. In the image forming apparatus 7400, a host computer 7401 is connected to the video controller 7402 through a network, a parallel interface, a serial interface, or the like. The video controller 7402 rasterizes printing data, which is transmitted when an instruction to start printing is given from the host computer 7401, into image data and transmits the image data to the printer engine 7403.

The video controller 7402 will be described. A video controller main control unit 7404 includes a panel operation unit (printing mode specifying unit) 7406 that decides a printing mode on the basis of an instruction from the user. The video controller 7402 notifies the printer engine 7403 through a communication interface of the printing mode.

The printer engine 7403 will be described. A printer engine main control unit 7405 includes a video I/F control unit 7407, a sensor control unit 7414, the fixing control unit 7415, and an image formation control unit 7408.

The video I/F control unit 7407 receives, from the video controller 7402, a printing mode, a timing to supply or discharge the recording material, a size of the recording material, and an instruction to start printing, and notifies the image formation control unit 7408 of the instruction from the video controller 7402.

The sensor control unit 7414 notifies the video controller 7402 through the video I/F control unit 7407 of size information of the recording material P, which is input from the size sensor 760.

The fixing control unit 7415 includes a supply power detection unit (supply power detecting unit) 7416, a power supply unit (power supplying unit) 7417, a temperature detection unit (temperature detecting unit) 7418, and a target temperature decision unit (target temperature deciding unit) 7419.

The supply power detection unit 7416 detects voltage and current between the AC power supply 750 and the heater 7100 by an AC voltage detection circuit 7307 and an AC current detection circuit 7308 (refer to FIG. 18) and calculates, in real time, power supplied to the heater 7100 on the basis of a voltage value and a current value supplied to the heater 7100. In the present embodiment, the power supplied to the heater 7100 is calculated by using both the voltage between the fixing portion 730 and the AC power supply 750 and the current flowing through the fixing portion 730, but the power supplied to the heater 7100 may be calculated by using any one of the voltage and the current.

The power supply unit 7417 controls a timing to turn on or off a triac 771 in synchronization with a zero-crossing signal input from a zero-crossing generation circuit 7306 to the fixing control unit 7415.

The temperature detection unit 7418 detects the temperature in the small-sized recording material passage region on the inner surface of the film 7102 by the thermistor 780. The temperature detection unit 7418 further detects a temperature in a small-sized recording material non-passage region of the film 7102 by the thermistors 781a and 781b.

The target temperature decision unit 7419 decides a target temperature of the heater 7100 on the basis of a printing mode that is specified (set) by the user through the panel operation unit 7406.

The image formation control unit 7408 includes a width information acquisition unit 7409, a conveying speed information acquisition unit 7410, and a supply power limit value decision unit 7411. The image formation control unit 7408 further includes an image formation continuation determination unit 7412 and an image forming condition switching unit 7413.

From the size information of the recording material P based on status information input by the size sensor 760 when the recording material P is set in the cassette 721, the width information acquisition unit 7409 acquires width information of the recording material P. The width information refers to information about a size of the recording material P in the direction Y orthogonal to the recording material conveying direction X.

The conveying speed information acquisition unit 7410 acquires conveying speed information of the recording material P from a printing mode-conveying speed conversion table (not illustrated) on the basis of the printing mode specified through the panel operation unit 7406.

The supply power limit value decision unit 7411 decides a limit value of the supply power on the basis of the width information acquired from the width information acquisition unit 7409 and the conveying speed information acquired from the conveying speed information acquisition unit 7410.

The image formation continuation determination unit 7412 determines whether or not to continue an image forming operation on the basis of the supply power detected by the supply power detection unit 7416 and the limit value of the supply power decided by the supply power limit value decision unit 7411.

The image forming condition switching unit 7413 executes switching of an image forming condition such as the conveying speed or suspending of image formation.

<Circuit Configuration Related to Fixing Control Unit 7415>

Figure 18:
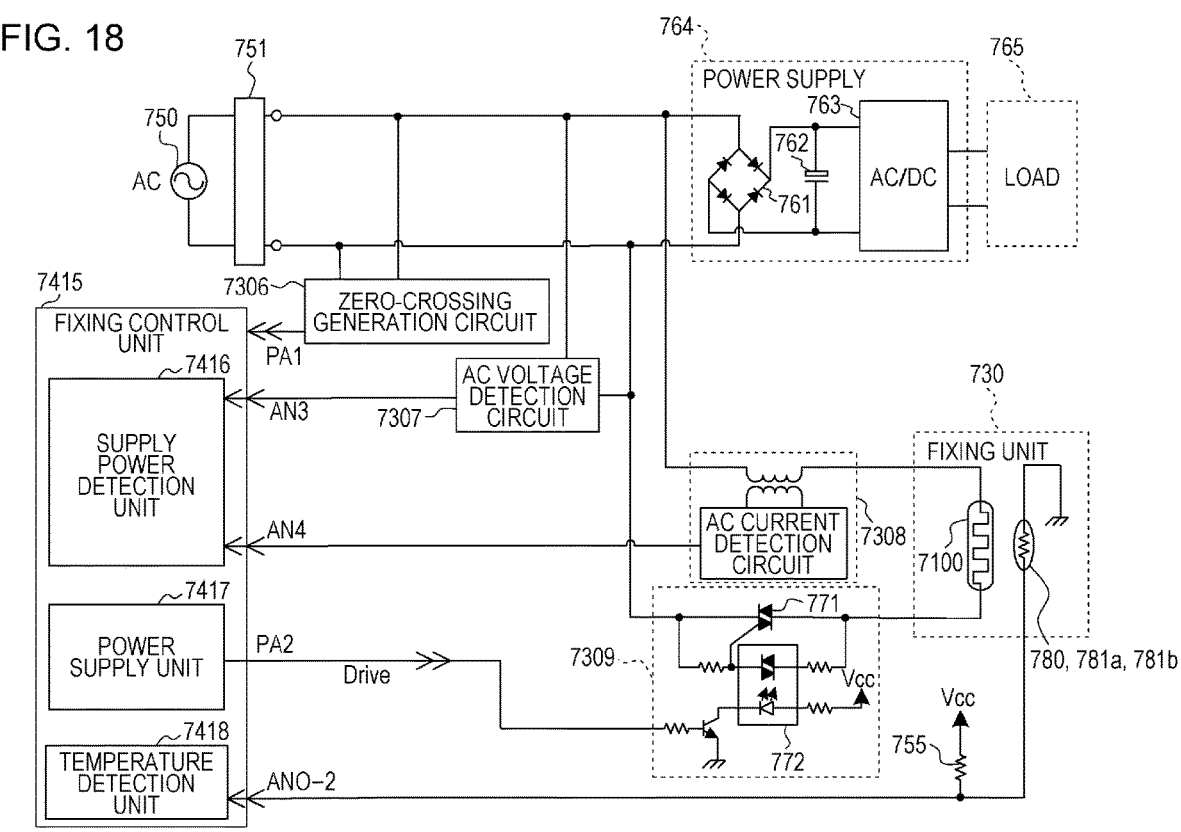
FIG. 18 illustrates a circuit configuration related to a fixing control unit.

A circuit configuration related to the fixing control unit 7415 will be described with reference to FIG. 18. FIG. 18 is a block diagram illustrating a relationship among the fixing control unit 7415, the fixing unit 730, the AC power supply 750, a switching power supply (hereinafter, referred to as a power supply) 764, the zero-crossing generation circuit 7306, the AC voltage detection circuit 7307, the AC current detection circuit 7308, and the fixing driving circuit 7309.

The AC power supply 750 is connected to the power supply 764 and the heater 7100 through an AC filter 751. The AC power supply 750 is also connected to the zero-crossing generation circuit 7306 through the AC filter 751.

The zero-crossing generation circuit 7306 is configured to reverse its output signal when voltage of the AC power supply 750 is equal to or less than, or equal to or greater than a threshold voltage that is approximately 0 V, and is used for controlling a timing to drive the heater.

The heater 7100 is driven on the basis of a zero-crossing timing by the fixing driving circuit 7309 constituted by using the triac 771, a triac coupler 772, and the like. The heater 7100 generates heat by receiving power supply, and the temperature of the film 7102 on the upstream side of the nip portion N in the recording material conveying direction X is detected by the thermistor 780 and the temperature of the heater 7100 is detected by the thermistors 781a and 781b.

A configuration is such that divided voltage between each of the thermistors 780, 781a, and 781b and a fixed resistance 755 is input to (three types of) analog input ports AN0 to AN2 of the temperature detection unit 7418. Each of the thermistors 780, 781a, and 781b has a characteristic that a resistance value thereof is reduced as the temperature increases, and the temperature detection unit 7418 monitors the divided voltage and thereby decides a current temperature on the basis of a voltage-temperature conversion table (not illustrated) that is set in advance.

The power supply unit 7417 outputs a driving signal for driving the fixing driving circuit 7309 on the basis of the temperature detected by the temperature detection unit 7418. Meanwhile, the power supply 764 includes a diode bridge 761 for rectifying AC voltage, a smoothing capacitor 762, and a DC-DC converter 763 that is on a post stage of the smoothing capacitor 762 and generates DC voltage. The DC voltage generated at the power supply 764 is supplied to a load 765 on a secondary side, such as a control unit or a driving unit for the image forming apparatus 7400.

The supply power detection unit 7416 detects the voltage and the current supplied to the heater 7100 by the AC voltage detection circuit 7307 and the AC current detection circuit 7308.

The AC voltage detection circuit 7307 outputs a voltage value corresponding to effective value voltage of the heater 7100. The supply power detection unit 7416 receives a detected voltage value, which is output from the AC voltage detection circuit 7307, at an analog input port AN3, and thereby detects a value of the effective value voltage input to the heater 7100.

On the other hand, the AC current detection circuit 7308 is arranged at a position where a value of the current flowing through the heater 7100 is able to be detected, and the supply power detection unit 7416 receives the detected current value, which is output from the AC current detection circuit 7308, at an analog input port AN4 and thereby detects the current flowing through the heater 7100.

<Temperature Control of Heater 7100>

Temperature control of the heater 7100 is performed by the power supply unit 7417. The power supply unit 7417 controls a timing to turn on the fixing driving circuit 7309 at a proportion (%) (hereinafter, referred to as a duty ratio) at which an area of a half period of the zero-crossing signal output from the zero-crossing generation circuit 7306 is equally divided into 100. Thereby, the power supplied to the heater 7100 is controlled in 101 steps of 0 to 100%.

The duty ratio is decided from a difference between the target temperature decided by the target temperature decision unit 7419 (refer to FIG. 17) and the detected temperature of the thermistor 780 detected by the temperature detection unit 7418. Since the difference between the target temperature and the detected temperature of the thermistor 780 is great when power feeding to the heater 7100 starts, a large duty ratio is set. Since the difference between the detected temperature of the thermistor 780 and the target temperature is small as the detected temperature is closer to the target temperature, the duty ratio is reduced. The duty ratio after the thermistor 780 reaches the target temperature needs power for compensating a heat quantity that is consumed when the unfixed toner image formed on the recording material P is fixed.

<Method of Calculating Supply Power>

For each half period of the zero-crossing signal, the supply power detection circuit 7416 acquires, from an analog input port AN3, an analog value of the voltage supplied to the heater 7100 and acquires, from an analog input port AN4, an analog value of the current supplied to the heater 7100. On the basis of the analog values that are acquired, a current value Ifsr and a voltage value Vfsr are decided by using a table (not illustrated) for conversion into actual current and voltage and power Pfsr supplied to the heater 7100 is calculated with a formula 1.

$$Pfsr = (Ifsr) \times (Vfsr) \quad \text{formula 1}$$

By calculating the power supplied to the heater 7100 from a time when a front end of the recording material enters the nip portion N till when a rear end of the recording material passes through the nip portion N in the recording material conveying direction X, average supply power for each page is calculated.

<Relationship Between Excessive Temperature Rising in Small-Sized Recording Material Non-Passage Region and Supply Power>

A relationship between excessive temperature rising in a small-sized recording material non-passage region of the heater 7100 and supply power to the heater 7100 will be described with reference to FIGS. 19A, 19B, and 19C.

FIG. 19A illustrates imaginary temperature distribution of the film 7102 in the direction Y orthogonal to the recording material conveying direction X at a time of excessive temperature rising in a non-passage region that is caused when wide-width paper (large-sized recording material) and narrow-width paper (small-sized recording material) are subjected to heat fixing processing after the thermistor 780 reaches the target temperature.

In a case where the wide-width paper is subjected to the heat fixing processing, the temperature distribution is almost bilaterally symmetrical and positions of a peak of excessive temperature rising in a non-passage region of the wide-width paper are almost the same between the thermistors 781a and 781b. This is because heat of a passage region of the wide-width paper is taken by the wide-width paper and heat of a non-passage region of the wide-width paper is taken by heat radiation from an end of the roller 7103 or an end of the film 7102.

In temperature distribution in a case where narrow-width paper is subjected to the heat fixing processing, a peak of excessive temperature rising in a non-passage region of the narrow-width paper is positioned inward and is higher compared to that in the wide-width paper. This is because the non-passage region of the narrow-width paper is larger than that of the wide-width paper and is less affected by heat radiation from the end of the roller 7103 or the end of the film 7102. That is, in the case of the narrow-width paper, the peak of excessive temperature rising in the non-passage region at the position inward than the thermistors 781a and 781b is higher than that of the wide-width paper in the direction Y orthogonal to the recording material conveying direction X.

Figure 19B:
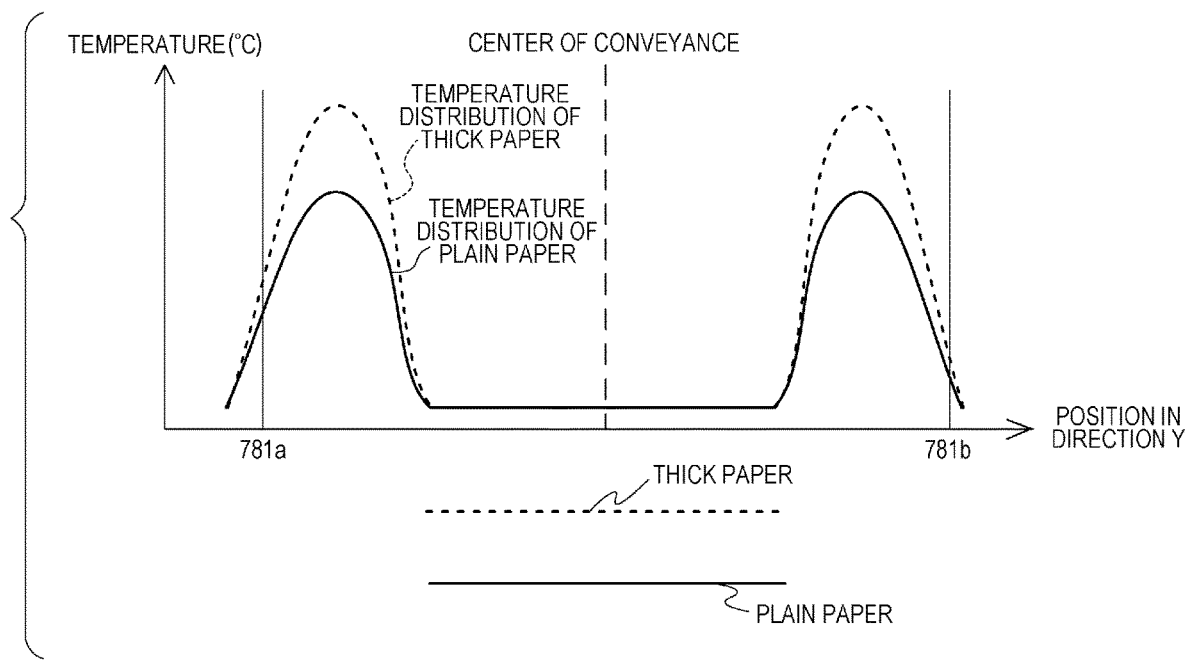
FIG. 19B illustrates imaginary temperature distribution at a time of excessive temperature rising in a non-passage region that is caused when thick paper and narrow-width plain paper are subjected to the heat fixing processing.

FIG. 19B illustrates imaginary temperature distribution of the film 7102 in the direction Y orthogonal to the recording material conveying direction X at a time of excessive temperature rising in a non-passage region that is caused when thick paper and narrow-width plain paper (small-sized recording material) are subjected to heat fixing processing after the thermistor 780 reaches the target temperature.

The temperature distribution of the narrow-width paper in FIG. 19A serves as temperature distribution of the plain paper in FIG. 19B. In a case where the thick paper is subjected to the heat fixing processing, a peak of the temperature distribution is higher than that in the plain paper. This is because, compared to the plain paper, the heat quantity taken during the heat fixing processing is larger and more supply power is required to keep the target temperature of the heater 7100 in the thick paper.

FIG. 19C illustrates imaginary temperature distribution of the film 7102 in the direction Y orthogonal to the recording material conveying direction X at a time of excessive temperature rising in a non-passage region that is caused when narrow-width thick paper (small-sized recording material) is subjected to heat fixing processing at a first speed or a second speed after the thermistor 780 reaches the target temperature. The first speed is set to 200 mm/s and the second speed is set to 100 mm/s.

The temperature distribution of the thick paper in FIG. 19B serves as temperature distribution of the first speed. In a case where the thick paper is subjected to the heat fixing processing at the second speed, a peak of the temperature distribution is lower than that in the plain paper of FIG. 19B. This is because as the conveying speed is higher, a heat conduction coefficient transmitted to the thick paper becomes small and the heat quantity taken by the thick paper becomes small, so that less supply power is required to keep the target temperature.

As described above, the excessive temperature rising in the non-passage region becomes great as the power supplied to the heater 7100 increases. There is a case where a printing mode set by the user and a printing mode suitable for the recording material P that is set in the cassette 721 do not match. In such a case, a conveying speed decided on the basis of the printing mode specified by the user does not match a conveying speed suitable for the recording material stored in the cassette 721 and the power supplied to the heater 7100 may increase excessively. When the supply power increases in this manner, unforeseen excessive temperature rising in the non-passage region may occur.

However, since there is a possibility that the specification by the user is not erroneous specification but specification intended by the user, an image formation operation is desired to be executed on the basis of the printing mode specified by the user in a range where the film 7102 or the roller 7103 of the fixing unit 730 is not damaged due to the excessive temperature rising in the non-passage region.

In the present embodiment, whether or not the heat fixing processing is able to be performed without damaging the fixing unit 730 is determined on the basis of the power supplied to the heater 7100. Since a degree of excessive temperature rising in the non-passage region changes depending on a width size of the recording material P, a supply power threshold (hereinafter, also referred to as a limit value of possible supply power (limit value)) supplied to the heater 7100 needs to be provided for each width size of the recording material. The supply power threshold is decided through experiment and examination performed by assuming a case where the excessive temperature rising in the non-passage region is conspicuous in a combination of temperature of an environment where the image forming apparatus 7400 is installed, an warm-up state of the fixing unit 730, a toner amount, and the like. The supply power threshold is desirably decided for each width size of the recording material P.

In the present embodiment, a width size of the recording material P, which is able to be specified, is divided into a plurality of ranges as illustrated in a table 1 and the limit value of the possible supply power is decided for each of the ranges in accordance with a width size with which the excessive temperature rising in the non-passage region is most conspicuous. The limit value of the possible supply power is indicated by the table 1.

TABLE 1

Limit value of possible supply power according to conveying speed and width size

| | Width size | | | | |
|---|---|---|---|---|---|
| Conveying speed | 320 to 297 mm | 297 to 260 mm | 260 to 220 mm | 220 to 200 mm | 200 to 157 mm |
| First speed (200 mm/s) | 720 W | 700 W | 650 W | 600 W | 550 W |
| Second speed (100 mm/s) | 670 W | 650 W | 600 W | 550 W | 500 W |

<Flowchart of Image Formation Operation>

Figure 20:
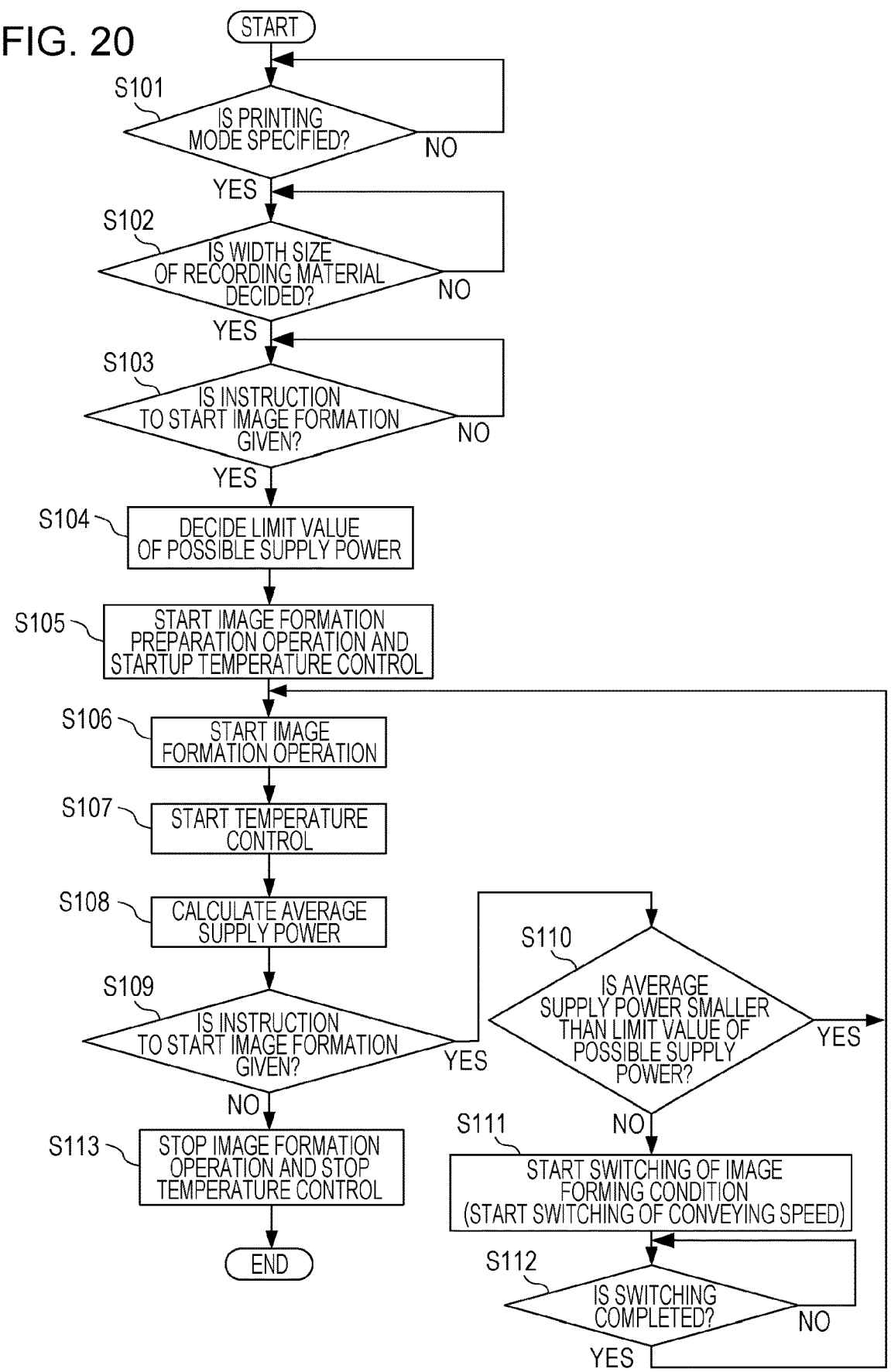
FIG. 20 is a flowchart of an image formation operation.

FIG. 20 is a flowchart in a case where an image formation operation is performed under the condition described above in the image forming apparatus 7400 of the present embodiment.

At S101, the user selects (sets) a printing mode from the panel operation unit 7406. The video controller 7402 notifies the printer engine 7403 through the video I/F control unit 7407 of the printing mode specified by the user through the panel operation unit 7406. The printer engine 7403 receives the printing mode by the video I/F control unit 7407 and notifies the image formation control unit 7408 of the printing mode.

At S102, the sensor control unit 7414 detects, by the size sensor 760, a recording material P set in the cassette 721 by the user, and notifies the image formation control unit 7408 through the video I/F control unit 7407 of a width size (width information) of the recording material P.

At S103, upon reception of an instruction to start printing from the host computer 7401, the video controller 7402 starts image development and notifies the printer engine 7403 through the video I/F control unit 7407 of an instruction to start image formation. The printer engine 7403 receives an instruction to start printing by the video I/F control unit 7407 and notifies the image formation control unit 7408 of the instruction to start image formation.

At S104, upon reception of the instruction to start image formation, the image formation control unit 7408 decides a conveying speed on the basis of the printing mode at that time. From the conveying speed based on the printing mode specified by the user and the width size of the recording material P set in the cassette 721 by the user, a limit value of possible supply power is decided on the basis of the table 1.

At S105, the image formation control unit 7408 starts an image formation preparation operation under an image forming condition according to the printing mode specified by the user. At the same time with the image formation preparation operation, the image formation control unit 7408 instructs the fixing control unit 7415 to start control of startup temperature under the image forming condition. Under the image forming condition, the fixing control unit 7415 decides a target temperature and a duty ratio and supplies power so that the temperature of the heater 7100 is the target temperature decided by the temperature detection unit 7418.

At S106, when a condition to start image formation is satisfied, the image formation control unit 7408 starts an image formation operation.

At S107, when an operation to feed the recording material P by rotation of the rollers 722 and 723 starts and a front end of the recording material P reaches the roller 724, the fixing control unit 7415 starts temperature control of the nip portion N. Then, on the basis of a differential temperature between the target temperature decided under the image forming condition and a current detected temperature of the thermistor 780 that is detected by the temperature detection unit 7418, the fixing control unit 7415 executes (starts) temperature control to decide the duty ratio.

At S108, the fixing control unit 7415 uses the current and the voltage that are detected by the supply power detection unit 7416 to calculate average supply power of each page from a time when the front end of the recording material enters the nip portion N till when the rear end of the recording material passes through the nip portion N, and notifies the image formation control unit 7408 of the average supply power.

At S109, the image formation control unit 7408 decides a next operation in accordance with whether or not an instruction to start image formation is given from the video controller 7402. In a case where there is an instruction to start image formation (YES), the procedure proceeds to S110, and in a case where there is no instruction (NO), the procedure proceeds to S113.

At S110, the average supply power acquired by the supply power detection unit 7416 and the limit value of the possible supply power decided by the supply power limit value decision unit 7411 are compared and whether or not the image formation operation is able to be continued is determined. In a case where the average supply power is smaller than the limit value of the possible supply power, it is determined that the image formation operation is able to be continued and the procedure returns to S106 to continue the image formation operation, and in a case where the average supply power is greater than the limit value of the possible supply power, it is determined that the image formation operation is not able to be continued and the procedure proceeds to S111.

At S111, the image forming condition switching unit 7413 switches the image forming condition. In the present embodiment, the conveying speed is switched to a lower speed.

At S112, the image formation control unit 7408 determines whether or not the switching of the image forming condition is completed. At S112, the image formation control unit 7408 waits until the switching is completed, and when the switching is completed, the procedure returns to S106 to continue the image formation operation.

At S113, the image formation control unit 7408 stops the image formation operation and instructs the fixing control unit 7415 to stop the temperature control.

The image forming apparatus 7400 of the present embodiment performs the following processing in a case where the printing mode specified by the user through the panel operation unit 7406 is different from a width size of the recording material P set in the cassette 721.

That is, in a case where the average supply power calculated by the supply power detection unit 7416 for each page exceeds the limit value of the possible supply power decided by the supply power limit value decision unit 7411, the image forming condition is switched. This makes it possible to suppress possibility of an image defect caused by damage to the fixing unit 730 due to excessive temperature rising in a non-passage region. In a case where the average supply power does not exceed the limit value of the possible supply power, the image formation operation is able to be continued, so that image quality and productivity that are required by the user are able to be provided in a range where the fixing unit 730 is not damaged.

Accordingly, an effect that priority is able to be given to a printing mode specified by the user and occurrence of an image defect due to damage to the fixing unit 730 is able to be suppressed is exerted.

The switching of the image forming condition is not limited to switching of the conveying speed, and the image formation operation may be suspended to execute a cleaning operation to clean outer peripheral surfaces of the photosensitive drums 71, which are rotating, by the cleaners 76 or the image formation operation may be suspended to notify warning on the operation panel unit 7406.

As the switching of the image forming condition, an operation of switching at least any one of a printing mode, a target temperature, an image formation interval when an image is continuously formed on a recording material, and an image formation stop time when an image is continuously formed on a recording material may be executed.

Embodiment 3

Another example of the image forming apparatus 7400 will be described. In the present embodiment, only a configuration different from that of Embodiment 2 will be described.

Figure 21:
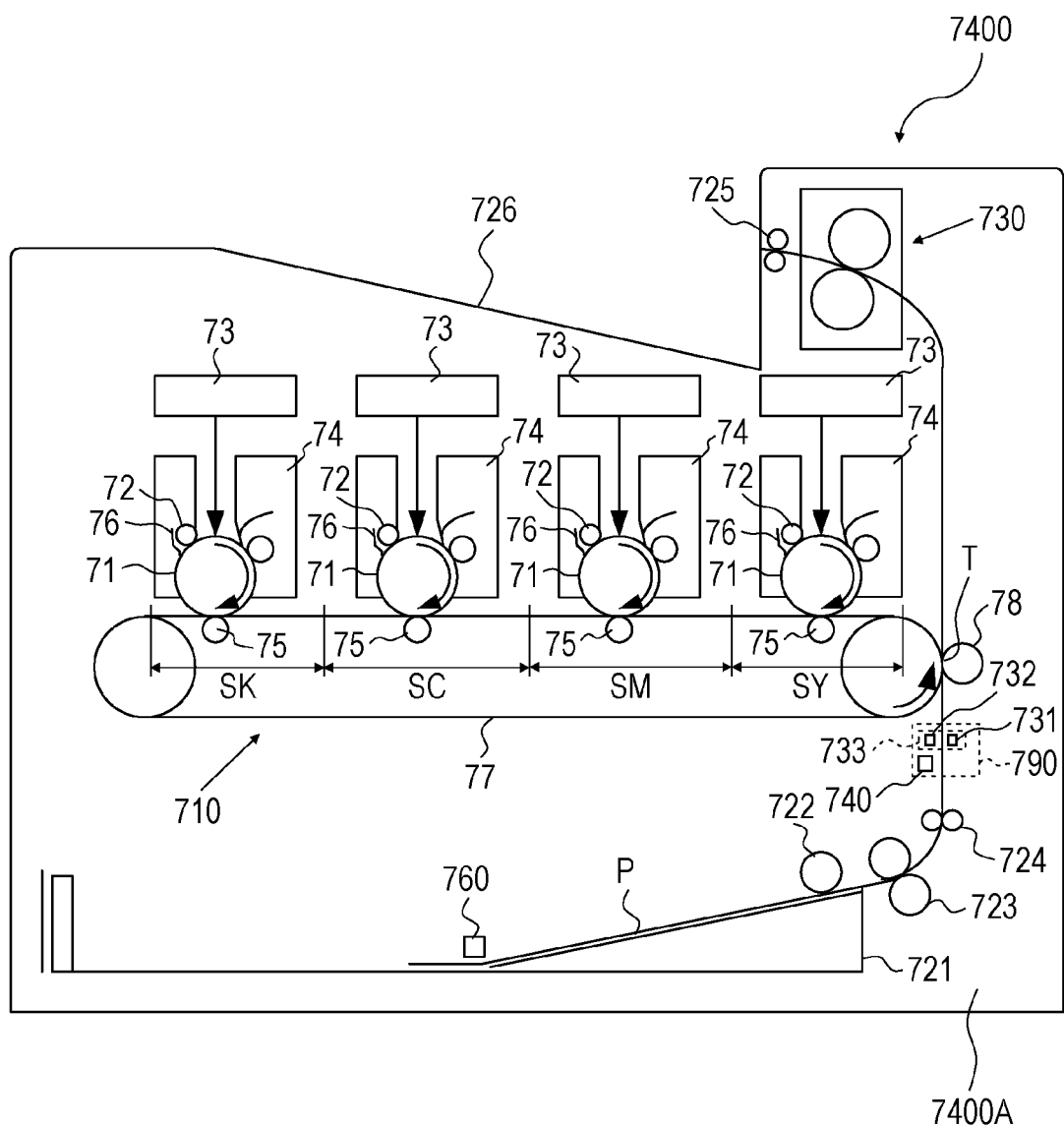
FIG. 21 is a sectional view illustrating a schematic configuration of an image forming apparatus according to Embodiment 3.

FIG. 21 is a sectional view illustrating an example of a schematic configuration of the image forming apparatus 7400 according to the present embodiment.

The image forming apparatus 7400 illustrated in the present embodiment has a medium determination device 790 arranged between the roller 724 and the transfer portion T. The medium determination device 790 includes a surface property detection unit 740 and a basis weight detection unit 733.

<System Configuration of Image Forming Apparatus 7400>

Figure 22:
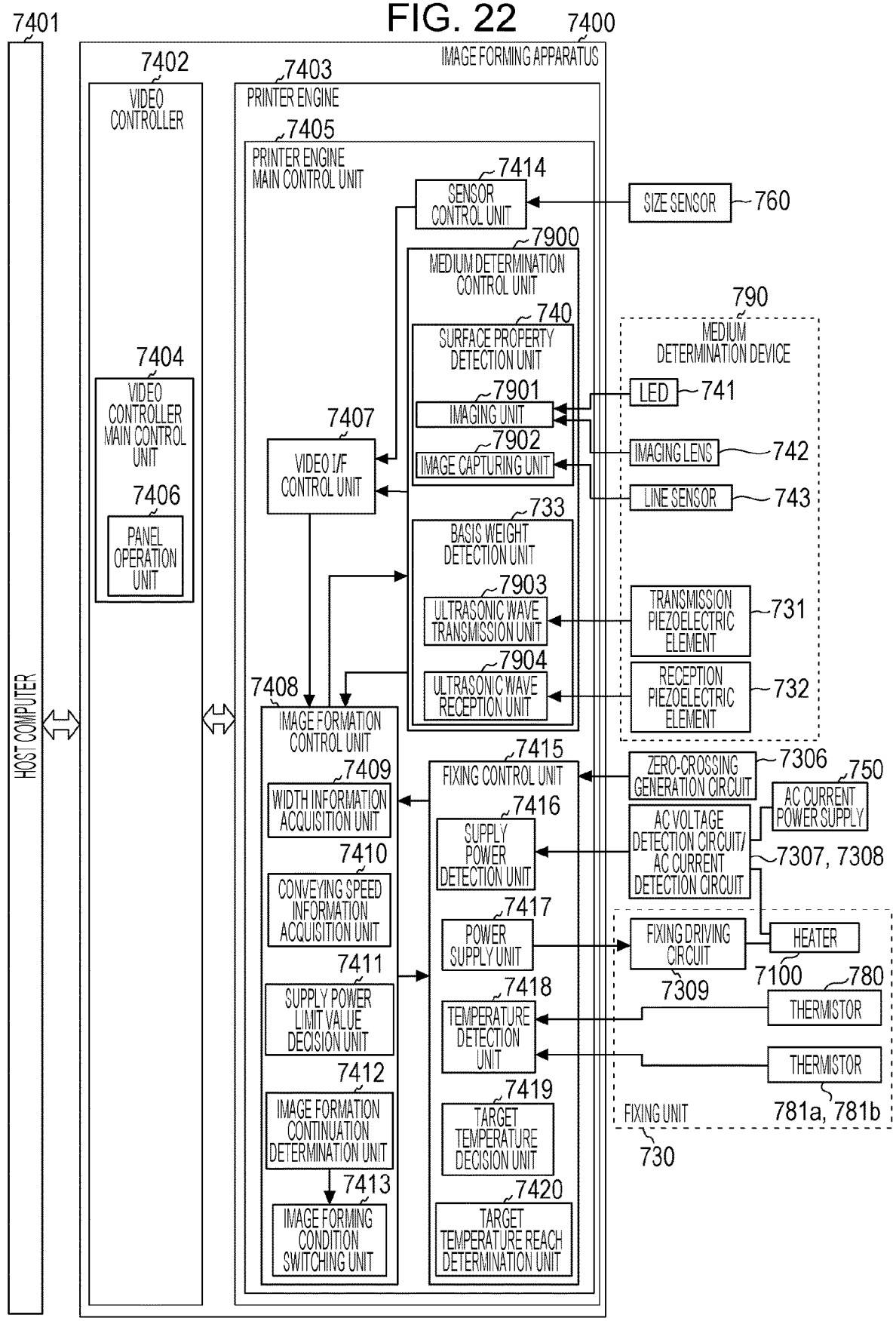
FIG. 22 illustrates a system configuration of the image forming apparatus.

FIG. 22 is a block diagram illustrating a system configuration of the image forming apparatus 7400.

A medium determination control unit 7900 is added to the printer engine main control unit 7405 illustrated in FIG. 22. The medium determination control unit 7900 determines the type of the recording material P on the basis of the surface property of the recording material P that is detected by the surface property detection unit 740 and the basis weight of the recording material P that is detected by the basis weight detection unit 933.

A target temperature reach determination unit 7420 is added to the fixing control unit 7415 in FIG. 22. The target temperature reach determination unit 7420 determines that the target temperature is reached (followed) in accordance with whether or not a detected temperature of the thermistor 780, which is detected by the temperature detection unit 7418, has reached the target temperature or more continuously for a predetermined time or more.

<Surface Property Detection Unit 740>

Figure 23A:
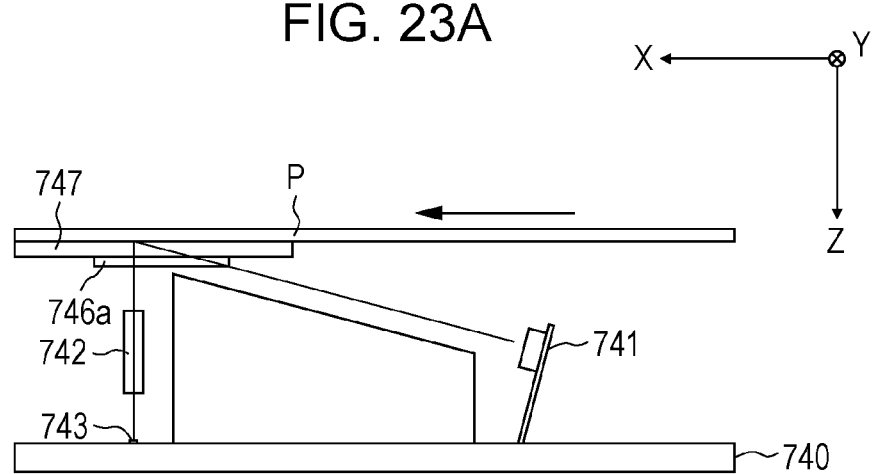
FIGS. 23A and 23B illustrate a schematic configuration of a surface property detection unit.
Figure 23B:
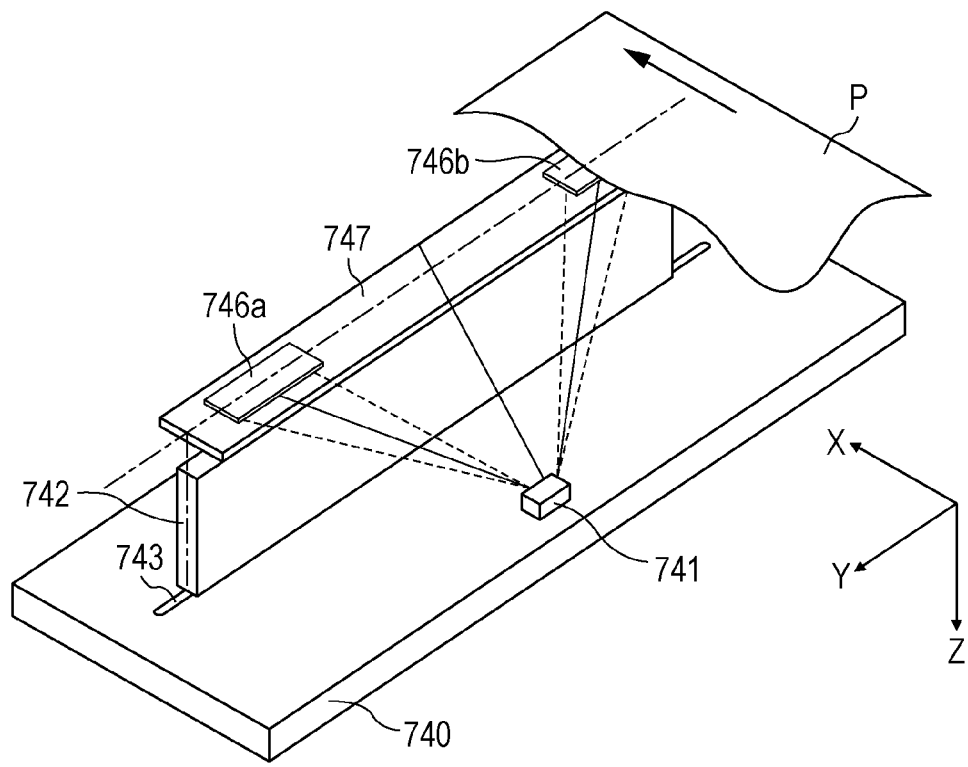

The surface property detection unit 740 will be described with reference to FIGS. 21, 22, 23A, and 23B. FIGS. 23A and 23B illustrate a schematic configuration of the surface property detection unit 740. FIG. 23A is a cross-sectional view illustrating a schematic configuration of the surface property detection unit 740 and FIG. 23B is a perspective view of the surface property detection unit 740 as viewed from the upstream side in the recording material conveying direction X.

As illustrated in FIG. 21, the surface property detection unit 740 is disposed so as to face the recording material conveying path in the thickness direction Z of the recording material P.

In FIGS. 23A and 23B, an LED 741 is an LED serving as an illumination unit configured to illuminate a surface of the recording material P with light and is arranged so as to illuminate the surface of the recording material P with light at an angle of substantially 10 degrees and generate brightness and darkness (shade) according to a surface property of the recording material P.

An imaging lens 742 focuses reflection light that is emitted from the LED 741 and reflected by the surface of the recording material P.

A line sensor 743 is a CMOS line sensor that captures an image of the light focused by the imaging lens 42 and captures an image of the brightness and darkness (shade) generated on the surface of the recording material P.

Reference plates 746a and 746b (hereinafter, referred to as inner surface reference plates 746a and 746b) are positioned at ends of a region that is able to be illuminated with light from the LED 741.

A protection member 747 protects the imaging lens 742 and the LED 741.

The imaging lens 742 and the line sensor 743 are arranged so as to be orthogonal to the recording material conveying direction X. Thus, the line sensor 743 is able to simultaneously capture the image of the reflection light that is emitted from the LED 741 and reflected by the surface of the recording material P and the image of the reflection light that is emitted from the LED 741 and reflected by the inner surface reference plates 746a and 746b.

<Method of Determining Surface Property of Recording Material P>

The surface property detection unit 740 includes an imaging unit 7901 and an image capturing unit 7902 as illustrated in FIG. 22.

In the imaging unit 7901, the LED 741 illuminates the surface of the recording material P that is conveyed with light. The reflection light (brightness and darkness) from the recording material P forms a surface image of the recording material through the imaging lens 742.

In the image capturing unit 7902, the surface image that is formed is captured by the line sensor 743. The surface image captured by the line sensor 743 is input to the image capturing unit 7902. The image capturing unit 7902 performs analog-to-digital conversion for the surface image input from the line sensor 743 for each pixel, and simultaneously reads an image on the same line in the direction Y orthogonal to the recording material conveying direction X on a line-by-line basis. In the present embodiment, by using an 8-bit A-D conversion IC, values from 0 to 255 are output through the analog-to-digital conversion. The image capturing unit 7902 further connects the input surface images in the conveying direction to acquire a two-dimensional surface image.

Though a method of determining the surface property of the recording material P by using the line sensor 743 has been described above, such description is given with a line sensor having a general configuration. The configuration of the line sensor 743, for example, such as the number of LEDs 741, is not limited to the aforementioned configuration.

<Basis Weight Detection Unit 733>

The basis weight detection unit 733 will be described with reference to FIGS. 21 and 22.

As illustrated in FIG. 21, in the basis weight detection unit 733, a transmission piezoelectric element 731 and a reception piezoelectric element 732 are arranged with the conveying path, in which the recording material is conveyed, held therebetween in order to acquire information about the basis weight of the recording material P that is conveyed. The basis weight herein is a mass per unit area of the recording material P and is represented as [$g/m^2$].

As illustrated in FIG. 22, the basis weight detection unit 733 includes an ultrasonic wave transmission unit 7903 and an ultrasonic wave reception unit 7904.

In the ultrasonic wave transmission unit 7903, when a pulse voltage at a predetermined frequency is input to an electrode terminal of the ultrasonic wave transmission unit 7903, the transmission piezoelectric element 731 oscillates to generate an acoustic wave and the acoustic wave propagates through the air. When the acoustic wave reaches the recording material P, the recording material P is oscillated by the acoustic wave. The acoustic wave generated in the ultrasonic wave transmission unit 7903 is propagated to the reception piezoelectric element 732 through the recording material P. The ultrasonic wave reception unit 7904 causes an electrode terminal of the ultrasonic wave reception unit 7904 to generate an output voltage according to an amplitude of the acoustic wave received by the reception piezoelectric element 732. This is the principle of an operation in a case where the ultrasonic wave is transmitted and received by using the transmission piezoelectric element 731 and the reception piezoelectric element 732.

In the present embodiment, the ultrasonic wave transmission unit 7903 and the ultrasonic wave reception unit 7904 transmit and receive the ultrasonic wave with a frequency characteristic of 32 kHz. The frequency of the ultrasonic wave is set in advance, and a frequency in an appropriate range may be selected in accordance with the configurations of the ultrasonic wave transmission unit 7903 and the ultrasonic wave reception unit 7904, a detection accuracy, and the like.

When an instruction to start measurement of the basis weight of the recording material P is given, the basis weight detection unit 733 instructs the ultrasonic wave transmission unit 7903 to transmit an ultrasonic wave signal. When an instruction to transmit the ultrasonic wave signal is given, the ultrasonic wave transmission unit 7903 outputs a fixed pulse so that influence of disturbance of a reflected wave or the like by the recording material P or a member around the conveying path is reduced and only a direct wave emitted from the transmission piezoelectric element 731 is able to be received by the reception piezoelectric element 732. Such a signal is called a burst wave.

The ultrasonic wave reception unit 7904 receives, through the reception piezoelectric element 732, an ultrasonic wave transmitted from the ultrasonic wave transmission unit 7903 or an ultrasonic wave transmitted by the recording material P. The ultrasonic wave reception unit 7904 successively performs analog-to-digital conversion to convert the received signal from an analog signal to a digital signal and extracts a peak (local maximal value) of the signal. The peak extraction is performed the predetermined number of times at a predetermined interval in both a state where the recording material P does not exist between the ultrasonic wave transmission unit 7903 and the ultrasonic wave reception unit 7904 and a state where the recording material P exists. The basis weight detection unit 733 calculates a transmission coefficient from a ratio between an average value of the predetermined number of times in the state where the recording material P does not exist and an average value of the predetermined number of times in the state where the recording material P exists. The transmission coefficient is a value corresponding to the basis weight, and the basis weight is determined on the basis of the value.

In the present embodiment, the type of the recording material P is determined on the basis of detection results of the surface property detection unit 740 and the basis weight detection unit 733.

Though a method of determining the type of the recording material P by the medium determination control unit 7900 on the basis of detection results of the surface property detection unit 740 and the basis weight detection unit 733 has been described above, the method of determination is not limited to the aforementioned method. A method of detecting the basis weight of the recording material P from a temperature difference between the film 7102 and the heater 7100 in the heat fixing processing operation of the fixing unit 730, or another recording material determination method may be used.

<Flowchart of Image Formation Operation>

Figure 24:
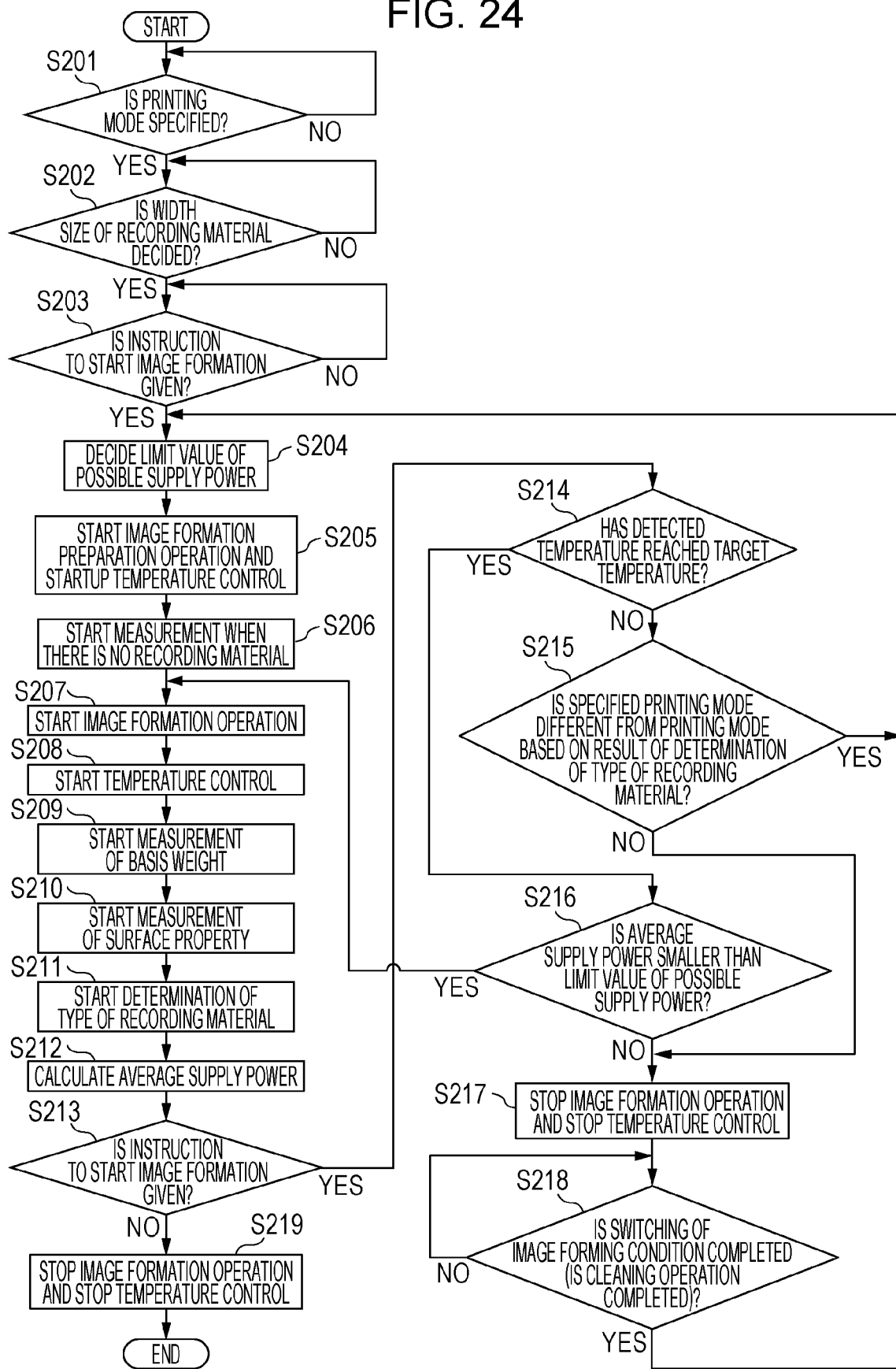
FIG. 24 is a flowchart of an image formation operation.

FIG. 24 is a flowchart in a case where an image formation operation is performed under the same condition as that of Embodiment 2 in the image forming apparatus 7400 of the present embodiment.

S201 through S205 are the same as S101 through S105 in FIG. 20.

At S206, during an image formation preparation operation after control of startup temperature of S205 starts, the medium determination control unit 7900 is instructed to start measurement when there is no recording material in order to measure basis weight measurement reference data. When there is no recording material P between the ultrasonic wave transmission unit 7903 and the ultrasonic wave reception unit 7904 in the basis weight detection unit 733, the medium determination control unit 7900 acquires data by receiving, with the reception unit, the ultrasonic wave transmitted by the transmission unit.

S207 and S208 are the same as S106 and S107 in FIG. 20.

At S209, at a timing when the front end of the recording material P has passed through the medium determination device 790, the image formation control unit 7408 instructs the medium determination control unit 7900 to start measurement of the basis weight. This is because the basis weight needs to be detected while the recording material P is in a stable state until the front end of the recording material P reaches the secondary transfer member 78. When there is a recording material P between the ultrasonic wave transmission unit 7903 and the ultrasonic wave reception unit 7904 in the basis weight detection unit 733, the medium determination control unit 7900 acquires data by receiving, with the reception unit, the ultrasonic wave transmitted by the transmission unit. The basis weight detection unit 733 calculates a transmission coefficient from measurement data when there is no recording material and measurement data when there is a recording material P, and decides the basis weight on the basis of the data.

At S210, at a timing when the front end of the recording material has passed through the secondary transfer member 78 and the recording material conveying speed is stable, the image formation control unit 7408 instructs the medium determination control unit 7900 to start measurement of the surface property. The recording material P is illuminated with light by the LED 741 and a surface image of the recording material P is captured by the line sensor 743, and the surface property detection unit 740 in the medium determination control unit 7900 acquires data thereof. The surface property detection unit 740 decides the surface property of the recording material P on the basis of data obtained through the image capturing.

At S211, the type of the recording material P is determined. The medium determination control unit 7900 determines the type of the recording material P that is being conveyed, on the basis of the basis weight of the recording material P that is detected by the basis weight detection unit 733 and the surface property of the recording material P that is detected by the surface property detection unit 740

S212 is the same as S108 in FIG. 20.

At S213, the image formation control unit 7408 decides a next operation in accordance with whether or not there is an instruction to start image formation is given from the video controller 7402. In a case where there is an instruction to start image formation (YES), the procedure proceeds to S214, and in a case where there is no instruction (NO), the procedure proceeds to S219.

At S214, the fixing control unit 7415 determines whether or not a detected temperature of the thermistor 780 has reached a target temperature by the target temperature reach determination unit 7420, and in a case where the detected temperature has reached the target temperature (YES), the procedure proceeds to S216, and in a case where the detected temperature has not reached the target temperature (NO), the procedure proceeds to S215.

At S215, whether or not the printing mode specified by the user is different from the printing mode that is decided on the basis of a result of determining the type of the recording material, which is acquired from the medium determination control unit 7900, is determined. In a case where the printing modes are not different (NO), the procedure proceeds to S217, and in a case where the printing modes are different (YES), the procedure returns to S204.

The determination of YES is made at S215 under the following condition. Such determination is made in a case where, when the target temperature reach determination unit 7420 determines that the target temperature is not reached, it is determined that the printing mode decided on the basis of the result of determining the type of the recording material, which is obtained from the medium determination control unit 7900, is different from the printing mode specified by the user.

At S216, the limit value of the possible supply power decided by the supply power limit value decision unit 7411 and the average supply power acquired by the supply power detection unit 7416 are compared and whether or not the image formation operation is able to be continued is determined. In a case where the average supply power is smaller than the limit value of the possible supply power (YES), it is determined that the image formation operation is able to be continued and the procedure returns to S207 to continue the image formation operation, and in a case where the average supply power is greater than the limit value of the possible supply power (NO), it is determined that the image formation operation is not able to be continued and the procedure proceeds to S217.

The determination of NO is made at S216 under the following condition. Such determination is made in a case where, when the target temperature reach determination unit 7420 determines that the target temperature is reached, it is determined that the average supply power acquired by the supply power detection unit 7416 is greater than the limit value of the possible supply power decided by the supply power limit value decision unit 7411.

At S217, the image formation control unit 7408 stops the image formation operation and instructs the fixing control unit 7415 to stop the temperature control.

At S218, the image forming condition switching unit 7413 determines whether or not the switching of the image forming condition is completed. That is, the image forming condition switching unit 7413 determines whether or not a cleaning operation (predetermined time until excessive temperature rising in a non-passage region is settled) to clean the outer peripheral surfaces of the photosensitive drums 71 that are rotating by the cleaners 76 is completed. In a case where the cleaning operation is completed (YES), the procedure returns to S204.

S219 is the same as S113 in FIG. 20.

The image forming apparatus 7400 of the present embodiment determines the type of the recording material P by the medium determination control unit 7900 even in a mode in which the image formation operation according to the specification by the user is performed. Then, the image formation continuation determination unit 7412 performs the following processing in a case where the target temperature reach determination unit 7420 determines that the temperature detected by the thermistor 780 does not follow the target temperature of the heater 7100 in a state of being lower than the target temperature. That is, the image formation continuation determination unit 7412 determines whether or not the image formation operation is able to be performed without damaging the fixing unit 730 on the basis of the printing mode based on the result of determining the type of the recording material P by the medium determination control unit 7900 and the printing mode specified by the user.

Moreover, the image formation continuation determination unit 7412 performs the following processing in a case where the target temperature reach determination unit 7420 determines that the temperature detected by the thermistor 780 follows the target temperature of the heater 7100. That is, the image formation continuation determination unit 7412 determines whether or not the image formation operation is able to be performed without damaging the fixing unit 730 on the basis of the average supply power of each page and the limit value of the possible supply power based on width information of the recording material P set by the user.

By performing such processing, image quality and productivity that are required by the user are able to be provided in a range where the fixing unit 730 is not damaged.

Even in a case where the printing mode is specified by the user, when the temperature detected by the thermistor 780 does not follow the target temperature in a state of being lower than the target temperature, the image forming apparatus 7400 of the present embodiment performs the following processing. That is, in a case where the printing mode specified by the user is different from the printing mode based on the result of determining the type of the recording material P by the medium determination control unit 7900, the image forming condition switching unit 7413 switches the image forming condition.

By performing such processing, it is possible to give priority to image quality and productivity that are required by the user while suppressing possibility of an image defect caused by damage to the fixing unit 730 due to excessive temperature rising in a non-passage region, even in a state where supply power to the fixing unit 730 is not stable.

Accordingly, the image forming apparatus 7400 of the present embodiment also exerts an effect that priority is able to be given to a printing mode specified by the user and occurrence of an image defect due to damage to the fixing unit 730 is able to be suppressed.

The switching of the image forming condition is not limited to switching of the cleaning operation, and the image formation operation may be suspended to notify warning on the operation panel unit 7406. As the switching of the image forming condition, an operation of switching at least any one of a printing mode, a conveying speed, a target temperature, an image formation interval when an image is continuously formed on a recording material, and an image formation stop time when an image is continuously formed on a recording material may be executed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-181189 filed Sep. 21, 2017 and Japanese Patent Application No. 2018-128920 filed Jul. 6, 2018, which are hereby incorporated by reference herein in their entirety.

What is claimed is:

1. An image forming apparatus comprising:
a plurality of storage portions in which recording materials are stored;
a feeding portion that feeds each of the recording materials from the plurality of storage portions;
an image forming portion that forms an image on the recording material fed from the feeding portion;
a fixing portion that fixes the image, which is formed on the recording material, to the recording material;
a recording material detection unit that outputs information for determining a type of the recording material;
a determination processing unit that performs processing for determining the type of the recording material on a basis of the information and outputs a result of the processing;
a printing setting input unit that is used for a user to input printing setting of the recording material; and
a control unit; wherein
the control unit determines the type of the recording material on a basis of the result of the processing,
compares printing setting suitable of for the determined type of the recording material and printing setting of the recording material input by the user, and
in a case where a difference between the printing setting suitable for the determined type of the recording material and the printing setting of the recording material input by the user falls in a predetermined range, the control unit performs a printing operation in accordance with the printing setting of the recording material input by the user, and
in a case where the difference falls outside the predetermined range, the control unit performs the printing operation by changing the printing setting of the recording material input by the user.

2. The image forming apparatus according to claim 1, wherein
the information for determining the type of the recording material includes any one or both of a surface property and a basis weight of the recording material.

3. The image forming apparatus according to claim 1, wherein
the printing setting suitable for the determined type of the recording material and the printing setting of the recording material input by the user include any one or both of a conveying speed at which the recording material is conveyed by the nip portion and a fixing temperature at which the image is fixed to the recording material.

4. The image forming apparatus according to claim 1, wherein
the changing in the case where the difference falls outside the predetermined range is changing of at least one of a printing speed at which the image is formed on the recording material by the image forming portion, a fixing temperature at which the image is fixed to the recording material by the fixing portion, a recording material feeding interval at which the recording material is continuously fed to the image forming portion by the feeding portion, and a time from when power supply to the fixing portion starts for fixing the image to a first recording material by the fixing unit till when the first recording material is started to be conveyed by the fixing portion.

5. An image forming apparatus comprising:
an image forming portion that forms an unfixed image on a recording material;

a fixing portion that has a fixing member, a heating member generating heat when power is supplied and heating the fixing member, and a nip portion forming member forming a nip portion with the fixing member, and that fixes the unfixed image to the recording material while pinching, conveying, and heating the recording material, on which the unfixed image is formed, by the nip portion;

a printing mode specifying unit configured to specify a printing mode;

a width information acquiring unit configured to acquire width information of the recording material in a direction orthogonal to a recording material conveying direction;

a conveying speed information acquiring unit configured to acquire conveying speed information of the recording material based on the printing mode specified by the printing mode specifying unit;

a supply power detecting unit configured to detect the power supplied to the heating member;

a supply power limit value deciding unit configured to decide a limit value of the power supplied to the heating member on a basis of the conveying speed information acquired by the conveying speed information acquiring unit and the width information acquired by the width information acquiring unit;

an image formation continuation determining unit configured to determine whether or not to continue an image formation operation on a basis of the power detected by the supply power detecting unit and the limit value of the power decided by the supply power limit value deciding unit; and an image forming condition switching unit configured to switch an image forming condition of the image formation operation in a case where the image formation continuation determining unit determines that the image formation operation is not able to be continued.

6. An image forming apparatus comprising:

an image forming portion that forms an unfixed image on a recording material;

a fixing portion that has a fixing member, a heating member generating heat when power is supplied and heating the fixing member, and a nip portion forming member forming a nip portion with the fixing member, and that fixes the unfixed image to the recording material while pinching, conveying, and heating the recording material, on which the unfixed image is formed, by the nip portion;

a printing mode specifying unit configured to specify a printing mode;

a width information acquiring unit configured to acquire width information of the recording material in a direction orthogonal to a recording material conveying direction;

a conveying speed information acquiring unit configured to acquire conveying speed information of the recording material based on the printing mode specified by the printing mode specifying unit;

a supply power detecting unit configured to detect the power supplied to the heating member;

a recording material determining unit configured to determine a type of the recording material;

a supply power limit value deciding unit configured to decide a limit value of the power supplied to the heating member on a basis of the conveying speed information acquired by the conveying speed information acquiring unit and the width information acquired by the width information acquiring unit;

an image formation continuation determining unit configured to determine whether or not to continue an image formation operation on a basis of the printing mode specified by the printing mode specifying unit and a printing mode decided on a basis of a result of determination for the recording material obtained by determination of the recording material determining unit; and an image forming condition switching unit configured to switch an image forming condition of the image formation operation in a case where the image formation continuation determining unit determines that the image formation operation is not able to be continued.

7. The image forming apparatus according to claim 6 further comprising:

a temperature detecting unit configured to detect a temperature of the fixing member; a target temperature deciding unit configured to decide a target temperature of the heating member on a basis of the printing mode specified by the printing mode specifying unit; and a target temperature reach determining unit configured to determine whether or not the temperature detected by the temperature detecting unit follows the target temperature decided by the target temperature deciding unit, wherein in a case where the target temperature reach determining unit determines that the temperature detected by the temperature detecting unit does not follow the target temperature, the image formation continuation determining unit determines whether or not to continue the image formation operation on a basis of the printing mode specified by the printing mode specifying unit and the printing mode decided by the recording material determining unit, and in a case where the target temperature reach determining unit determines that the temperature detected by the temperature detecting unit follows the target temperature, the image formation continuation determining unit determines whether or not to continue the image formation operation on a basis of the power detected by the supply power detecting unit and the limit value of the power decided by the supply power limit value deciding unit.

8. The image forming apparatus according to claim 7, wherein in a case where a state where the temperature detected by the temperature detecting unit is equal or greater than the target temperature decided by the target temperature deciding unit has continued for a predetermined time or more, the target temperature reach determining unit determines that the temperature detected by the temperature detecting unit follows the target temperature.

9. The image forming apparatus according to claim 6, wherein the width information acquiring unit decides the width information in accordance with information based on a size sensor that detects a size of the recording material or information of a size of the recording material specified by a user.

10. The image forming apparatus according to claim 6, wherein the conveying speed information acquiring unit decides the conveying speed information on a basis of the printing mode specified by the printing mode specifying unit.

11. The image forming apparatus according to claim 6, wherein the supply power detecting unit decides the power supplied to the heating member on a basis of power calculated by using any one or both of voltage between the fixing portion and an AC power supply and current flowing through the fixing portion.

12. The image forming apparatus according to claim 6, wherein the image forming condition switching unit executes an operation of switching at least any one of the printing mode, the conveying speed of the recording material, a cleaning operation of cleaning a carrying member of the image forming portion, which carries an unfixed image, the target temperature of the heating member, an image formation interval when an image is continuously formed on the recording material, and an image formation stop time when an image is continuously formed on the recording material.

* * * * *